United States Patent
Takeda et al.

(10) Patent No.: US 8,333,386 B2
(45) Date of Patent: Dec. 18, 2012

(54) SEAL STRUCTURE FOR CONNECTION SECTIONS AND SEAL MEMBER USED FOR THE SAME

(75) Inventors: Hideyuki Takeda, Kasugai (JP); Fumihito Tsuchiya, Komaki (JP); Tetsuya Ishihara, Nagoya (JP)

(73) Assignee: CKD Corporation, Komaki-shi (JP)

( * ) Notice: Subject to any disclaimer, the term of this patent is extended or adjusted under 35 U.S.C. 154(b) by 604 days.

(21) Appl. No.: 12/449,395

(22) PCT Filed: Mar. 21, 2008

(86) PCT No.: PCT/JP2008/055310
§ 371 (c)(1),
(2), (4) Date: Aug. 6, 2009

(87) PCT Pub. No.: WO2008/123152
PCT Pub. Date: Oct. 16, 2008

(65) Prior Publication Data
US 2010/0320699 A1 Dec. 23, 2010

(30) Foreign Application Priority Data

Mar. 27, 2007 (JP) .................................. 2007-082890
Nov. 14, 2007 (JP) .................................. 2007-295150

(51) Int. Cl.
*F16L 17/00* (2006.01)
(52) U.S. Cl. .......................... 277/608; 277/626; 285/336
(58) Field of Classification Search .................. 277/608, 277/612, 626; 285/336, 328, 335, 331, 349
See application file for complete search history.

(56) References Cited

U.S. PATENT DOCUMENTS

| | | | | | |
|---|---|---|---|---|---|
| 4,313,609 | A | * | 2/1982 | Clements | 277/641 |
| 6,123,339 | A | * | 9/2000 | Otsuji et al. | 277/602 |
| 6,581,941 | B2 | * | 6/2003 | Carr | 277/609 |
| 7,441,525 | B2 | * | 10/2008 | Jessberger et al. | 123/90.37 |

(Continued)

FOREIGN PATENT DOCUMENTS

JP U-04-064662 6/1992

(Continued)

OTHER PUBLICATIONS

Japanese Office Action issued in Japanese Application No. 2007-082890 dated Aug. 9, 2011 (with translation).

(Continued)

*Primary Examiner* — Gilbert Lee
(74) *Attorney, Agent, or Firm* — Oliff & Berridge, PLC

(57) ABSTRACT

A seal structure for connection sections, which facilitates installation and removal of a seal member from the connection sections. The seal member is placed in the connection sections between a first part and a second part. A first groove-ridge section is formed at the connection section of the first part, and a second groove-ridge section is formed at the connection section of the second part. The seal member has, on one face, a first fitting section fitting to the first groove-ridge section, and also has, on the other face, a second fitting section fitting to the second groove-ridge section. Press-fitting interferences in the wall-thickness direction are provided at the first and second fitting sections. The seal member has an extended section protruding radially outward from an annular body section where the first and second fitting sections are provided. The extended section protrudes to a position outside the connection sections of the first and second parts.

9 Claims, 25 Drawing Sheets

U.S. PATENT DOCUMENTS

| | | | |
|---|---|---|---|
| 7,815,198 B2 * | 10/2010 | Tani | 277/644 |
| 7,828,302 B2 * | 11/2010 | Hurlbert et al. | 277/637 |
| 7,967,298 B2 * | 6/2011 | Hurlbert et al. | 277/567 |
| 2003/0197335 A1 | 10/2003 | Germain | |
| 2004/0046390 A1 | 3/2004 | Mosse et al. | |
| 2004/0188955 A1 * | 9/2004 | Takahiro et al. | 277/626 |
| 2005/0212291 A1 * | 9/2005 | Edwards | 285/364 |
| 2007/0080504 A1 * | 4/2007 | Buermann | 277/608 |
| 2007/0234995 A1 * | 10/2007 | Jessberger et al. | 123/195 C |
| 2008/0018057 A1 * | 1/2008 | Gibb et al. | 277/608 |

FOREIGN PATENT DOCUMENTS

| | | |
|---|---|---|
| JP | U-4-101862 | 9/1992 |
| JP | A-07-133869 | 5/1995 |
| JP | A-2002-372152 | 12/2002 |
| JP | A-2005-325853 | 11/2005 |
| JP | A-2006-90378 | 4/2006 |
| JP | A-2006-153180 | 6/2006 |
| JP | A-2006-316805 | 11/2006 |
| KR | 2003-0084631 | 11/2003 |
| WO | WO 2006/059362 A1 | 6/2006 |

OTHER PUBLICATIONS

Jul. 14, 2011 Office Action issued in Korean Patent Application No. 10-2009-7021831 with translation.

Chinese Office Action dated Nov. 12, 2010 in Chinese Patent Application No. 20080010135.9 (with translation).

Feb. 7, 2012 Office Action issued in the Japanese Patent Application No. 2007-082890 (with English translation).

Korean Office Action issued in Korean Application No. 10-2009-7021831 (w/ Translation).

* cited by examiner

SEAL STRUCTURE FOR CONNECTION SECTIONS AND SEAL MEMBER USED FOR THE SAME

TECHNICAL FIELD

The present invention relates to a seal structure for connection sections in which a seal member is placed between a first part and a second part and the seal member used therefor.

BACKGROUND ART

Heretofore, for controlling chemical liquid in a semiconductor manufacturing process and a liquid crystal manufacturing process, various fluid devices are used. The fluid devices include: valves such as flow rate control valves and open/close valves, filters, sensors such as pressure sensors and flow rate sensors, and piping blocks such as joint blocks and passage blocks. In recent years, for achieving size reduction, these fluid devices are directly coupled to each other into a single unit and their connection sections are sealed. Patent Literature 1 discloses one example of a seal structure for connection sections in which a seal member is placed between a first part and a second part.

FIG. 36 is a cross-sectional view of an integrated panel 1100 that applies a conventional seal structure for connection sections. The integrated panel 1100 is constituted of a valve 1102 fixed on a panel member 1101 by bolts 1116 and seal members 1112 are placed between the panel member 1101 and the valve 1102.

The panel member 1101 is made of fluorocarbon resin. On a connection section 1101a of the panel member 1101, a vertical passage 1104 communicating with a first port 1103 and a vertical ring passage 1106 formed around the vertical passage 1104, communicating with a second port 1105 are opening. The connection section 1101a is formed with groove-ridge sections having annular protrusions 1107 outside the passages 1104 and 1106. On the other hand, the valve 1102 includes a passage block 1108 made of fluorocarbon resin. On a connection section 1108a of the passage block 1108, a supply-side passage 1109 facing the vertical passage 1104 and a discharge-side passage 1110 facing the vertical ring passage 1106 of the panel member 1101 are opening. The connection section 1108a is formed with groove-ridge sections having annular protrusions 1111 outside the passages 1109 and 1110.

The seal member 1112 is made of ring-like shaped fluorocarbon resin and formed on both ends with annular grooves 1113 and 1114 fitted with the annular protrusions 1107 and 1111 respectively. Each groove width of the annular grooves 1113 and 1114 is designed 0.75 to 0.85 times narrower than a groove width of the annular protrusion so that inner and outer peripheral surfaces of the annular protrusions 1107 and 1111 are pressed to have contact with corresponding inner peripheral surfaces of the annular grooves 1113 and 1114. Further, the seal member 1112 is formed with a ring-shaped flange 1115 for attachment and detachment horizontally extending from an outer peripheral wall of the seal member 1112. A thickness of the flange 1115 is designed to be thinner than a clearance W between the connection section 1101a and the connection section 1108a.

For attachment of the seal member 1112, the seal member 1112 is firstly mounted on the panel member 1101 in a manner that the annular protrusion 1107 of the panel member 1101 is inserted in the annular groove 1113 of the seal member 1112. After that, the valve 1102 is mounted on the panel member 1101 in a manner that the annular protrusion 1111 of the passage block 1108 is inserted in the annular groove 1114 of the seal member 1112. Subsequently, the bolts 1116 are fastened to fit the annular protrusions 1107 and 1111 in the annular grooves 1113 and 1114 of the seal member 1112.

For detachment of the seal member 1112, the bolts 1116 are unscrewed first and the valve 1102 is removed from the panel member 1101. At this time, the seal member 1112 remains attached to either one of the panel member 1101 or the passage block 1108. Accordingly, the flange 1115 is pulled by a tool or fingers to detach the seal member 1112 from either one groove-ridge section of the panel member 1101 or the passage block 1108.

CITATION LIST

Patent Literature
Patent Literature 1: JP2006-90378A (see page 11, paragraph [0041])

SUMMARY OF INVENTION

Technical Problem

In the conventional seal structure for connection sections, however, the flange 1115 of the seal member 1112 is small and held between the connection sections 1101a and 1108a, making it hard to pick up the flange 1115 by fingers. Accordingly, the flange 1115 has to be picked up by use of a tool in the conventional seal structure for connection sections. However, the tool sometimes rubs or hits against the connection sections 1101a and 1108a during the operation, scratching the connection sections 1101a and 1108a. When scratches are made on the connection sections 1101a and 1108a, the panel member 1101 and the passage block 1108 have to be entirely replaced for preventing fluid leakage in the scratched region. As a result, attachment and detachment of the seal member requires a lot of time and effort.

Even if the flange 1115 can be picked up by fingers, the thickness of the flange 1115 is thinner than the clearance W between the connection sections 1101a and 1108a to prevent the flange 1115 from coming into close contact with the connection section 1101a of the panel member 1101 or the connection section 1108a of the passage block 1108 and thereby allow the flange 1115 to be picked up by fingers when the passage block 1108 is mounted to the panel member 1101 by the bolts 1116. Therefore, when the flange 1115 is pinched and pulled by fingers, the flange 1115 may be torn off and broken, which is not suitable for practical use.

Under those circumstances, there has been a demand for a seal structure for connection sections in which a seal member placed between a first part and a second part can be easily detached by hand.

Further, in the conventional seal structure for connection sections, each groove width including an opening of the annular grooves 1113 and 1114 of the seal member 1112 is narrower than each width of the annular protrusions 1107 and 1111. Accordingly, a positioning relationship among the first and second parts and the seal member becomes unstable until leading ends of the annular protrusions 1107 and 1111 are inserted in the annular grooves 1113 and 1114, and the annular protrusions 1107 and 1111 are not easily fitted in the annular grooves 1113 and 1114. Therefore, a seal structure for connection sections in which an annular protrusion is easily inserted in an annular groove and a seal member is efficiently mounted has been desired.

The present invention has been made to solve the above problems and has a purpose to provide a seal structure for connection sections suitable for attachment and detachment of a seal member.

Solution to Problem

A seal structure for connection sections according to the present invention has the following structure.

(1) Specifically, a first aspect of the present invention provides a seal structure for connection sections comprising: a first part including a connection section formed with a first groove-ridge section; a second part including a connection section formed with a second groove-ridge section; and a seal member placed between the connection sections of the first part and the second part, the seal member comprising a first fitting portion in a first surface engageable with the first groove-ridge section and a second fitting portion in a second surface engageable with the second groove-ridge section, each of the first and second fitting portions being formed with a press-fitting interference in the thickness direction. The seal member includes an extended section extending outside an annular body section including the first and second fitting portions in a radially outward direction, the extended section protruding outward than the connection sections of the first and second parts.

(2) In the seal structure for connection sections according to (1), preferably, the seal member includes a holding portion extending from an end portion of the extended section in a direction orthogonal to the extended section.

(3) In the seal structure for connection sections according to (1) or (2), preferably, the seal member comprises positioning protrusions extending from both sides of the extended section and in parallel with an axis of the body section, the first part includes a first positioning hole for receiving one of the positioning protrusions to position the first part in place, and the second part includes a second positioning hole for receiving one of the positioning protrusions to position the second part in place.

(4) A second aspect of the present invention provides a seal structure for connection sections comprising: a first part including a connection section formed with a first annular protrusion; a second part including a connection section formed with a second annular protrusion; and a seal member placed between the connection sections of the first part and the second part, the seal member comprising a first annular groove in a first surface for receiving the first annular protrusion and a second annular groove in a second surface for receiving the second annular protrusion on the other surface, each of the first and second annular grooves being formed with a press-fitting interference in a thickness direction. The seal structure for connection sections is capable of sealing the connection sections in a manner that the first annular protrusion is press-fitted in the press-fitting interference of the first annular groove and the second annular protrusion is press-fitted in the press-fitting interference of the second annular groove. Further, the seal member includes guide portions in openings of the first and second annular grooves for guiding the first and second annular protrusions to the press-fitting interferences via the openings.

(5) A third aspect of the present invention provides a seal structure for connection sections comprising: a first part including a connection section formed with a first annular groove; a second part including a connection section formed with a second annular groove; and a seal member placed between the connection sections of the first part and the second part, the seal member comprising a first annular protrusion in a first surface being fitted in the first annular groove and a second annular protrusion in a second surface being fitted in the second annular groove, each of the first and second annular protrusions being formed with a press-fitting interference in a thickness direction. The seal structure for connection sections is capable of sealing the connection sections in a manner that the press-fitting interference of the first annular protrusion is press-fitted in the first annular groove so that the first annular protrusion is fitted in the first annular groove and the press-fitting interference of the second annular protrusion is press-fitted in the second annular groove so that the second annular protrusion is fitted in the second annular groove. Further, the seal member includes guide portions at leading ends of the first and second annular protrusions for guiding the press-fitting interferences of the first and second annular protrusions to the first and second annular grooves respectively.

(6) A fourth aspect of the present invention provides a seal structure for connection sections comprising a first part and a second part, each being formed with an annular groove-ridge section along a periphery of a passage opening portion. The seal structure for connection sections further comprises a seal member placed between the connection sections of the first and second parts and formed with an annular ridge-groove section press-fitted in the annular groove-ridge section for sealing the connection sections of the first and second parts. The seal member includes: a cylindrical body section formed with the annular ridge-groove section; an extended section radially outwardly extending from the body section; and a holding portion connected to the body section via the extended section and extending orthogonally with respect to the extended section, the holding portion having a hook portion projecting toward the body section, the first and second parts including protrusions to be engaged with the hook portion.

(7) In the seal structure for connection sections according to (6), preferably, the seal member comprises the hook portion in the holding portion so that the hook portion is hooked on the protrusion for positioning the annular ridge-groove section and the annular groove-ridge section.

(8) In the invention disclosed in (6) or (7), the seal member comprises a guide portion for aligning the annular ridge-groove section with the annular groove-ridge section and a press-fitting interference having a thickness in the circumferential direction of the annular ridge-groove section formed on an inward side of the guide portion, wherein the annular groove-ridge section is temporarily inserted in the guide portion when the hook portion is hooked on the protrusion.

(9) In the seal structure for connection sections according to (6) or (7), preferably, the seal member includes the holding portion divided and spaced in a circumferential direction.

(10) In the seal structure for connection sections according to (6) or (7), preferably, the seal member comprises the holding portion annularly formed in a circumferential direction and the hook portion formed along an inner periphery of the holding portion.

(11) In the seal structure for connection sections according to any one of (6) to (9), preferably, the seal member is formed with a through hole in a region where the holding portion is connected to the extended section.

(12) In the seal structure for connection sections according to any one of (6) to (10), preferably, the seal member is formed with the hook portion at both ends of the holding portion.

(13) Another aspect of the present invention provides a seal member applied to the seal structure for connection sections according to any one of (6) to (11).

Advantageous Effects of Invention

In the seal structure for connection sections having the above configuration, when the first part and the second part are separated, the seal member remains attached to either one of the first or second part and a extended section protrudes outside the connection section of the first or second part. Though the extended section is placed between the connection sections of the first and second parts and attached to either one of the parts, the seal member may be easily pulled to detach from the first or second part by firmly pinching the extended section to remove from the connection section of the first or second part with fingers. Therefore, according to the seal structure for connection sections of the present invention, the seal member placed between the connection sections of the first and second parts can be easily detached by hand.

In the seal structure for connection sections of the present invention, the seal member includes holding portions at ends of the extended section protruding outside the connection sections of the first and second parts, providing a wide holding region. Thereby, the holding portions can be prevented from slipping off fingers when the holding portions are pulled to detach the seal member from the first or second part.

It is further preferable that if an inner wall of the holding portion is aligned with the outer periphery of the connection sections of the first and second parts, the inner wall of the holding portion surrounds the connection sections of the first and second parts, the seal member being easily mounted to the first or second part.

In the seal structure for connection sections of the present invention, positioning protrusions of the seal member are fitted in a first positioning hole of the first part and a second positioning hole of the second part for positioning the seal member with respect to the first and second parts. Therefore, the seal member can be easily mounted.

In the seal structure for connection sections of the present invention, each opening of first and second annular grooves has a guide portion for guiding first and second annular protrusions to press-fitting interferences. Thereby, the first and second annular protrusions can be easily press-fitted in the press-fitting interferences and thus the seal member can be efficiently mounted.

Alternately, in the seal structure for connection sections of the present invention, guide portions are provided at leading ends of the first and second annular protrusions respectively for introducing the press-fitting interference to the first and second annular grooves. Thereby, the first and second annular protrusions can be easily press-fitted in the first and second annular grooves and thus the seal member can be efficiently mounted.

In the seal structure for connection sections of the present invention, when the first and second parts are connected, a hook portion is hooked on at least either one of the first or second protrusion to prevent the seal member from falling off. Thereby, the seal member is prevented from being deformed and damaged. Thus, annular groove-ridge sections of the first and second parts and annular ridge-groove sections of the seal member are evenly press-fitted in the circumferential direction, preventing fluid leakage. Therefore, according to the seal structure for connection sections of the present invention, the connection sections between the first and second parts can be certainly sealed.

Further, in the seal structure for connection sections of the present invention, when the first and second parts are installed in the vertical direction, for example, the hook portion is engaged with the first or second protrusion and the seal member is thereby prevented from falling off the first or second part. At this time, the annular groove-ridge sections of the first and second parts and the annular ridge-groove sections of the seal member can be kept in a proper position. Accordingly, the annular groove-ridge sections and the annular ridge-groove sections are not misaligned in the press-fitted region, preventing fluid leakage. Consequently, according to the seal structure for connection sections of the present invention, the connection sections between the first and second parts can be certainly sealed.

Furthermore, when the hook portion is engaged with the first or second protrusion and the annular groove-ridge section is temporarily inserted in the guide portion formed in the ridge-groove section, the first part and the second part come closer each other to press-fit the annular ridge-groove section with the annular groove-ridge section. Concurrently, the annular groove-ridge section is smoothly guided through the guide portion of the annular ridge-groove section to the press-fitting interferences, so that the annular groove-ridge section is evenly press-fitted in the press-fitting interferences of the annular ridge-groove section and sealed appropriately.

In the seal structure for connection sections of the present invention, the holding portions are divided and spaced to be easily deformed. Thereby, the hook portions can be easily engaged with the first or second protrusion.

In the seal structure for connection sections of the present invention, the hook portions are provided along an inner periphery of the holding portion which is annularly formed in the circumferential direction of the seal member, so that the hook portions can be stably engaged with the first or second protrusion even if the thickness of the holding portion is thin.

In the seal structure for connection sections of the present invention, the extended section is formed with a through hole on the region where the holding portion is connected so that the hook portion can be easily removed from a die without being deformed.

Alternatively, when manufacturing the seal member, the seal member may have undercut for forming the hooked portion at the time of molding because the seal member can be easily removed from the die by deforming the holding portion bent toward the through hole.

In the seal structure for connection sections and the seal member of the present invention, both ends of the holding portion are provided with the hook portions, so that the mounting orientation to mount the seal member to the first and second parts is not limited.

EXPLANATION FOR REFERENCE CODES

Figure 1:
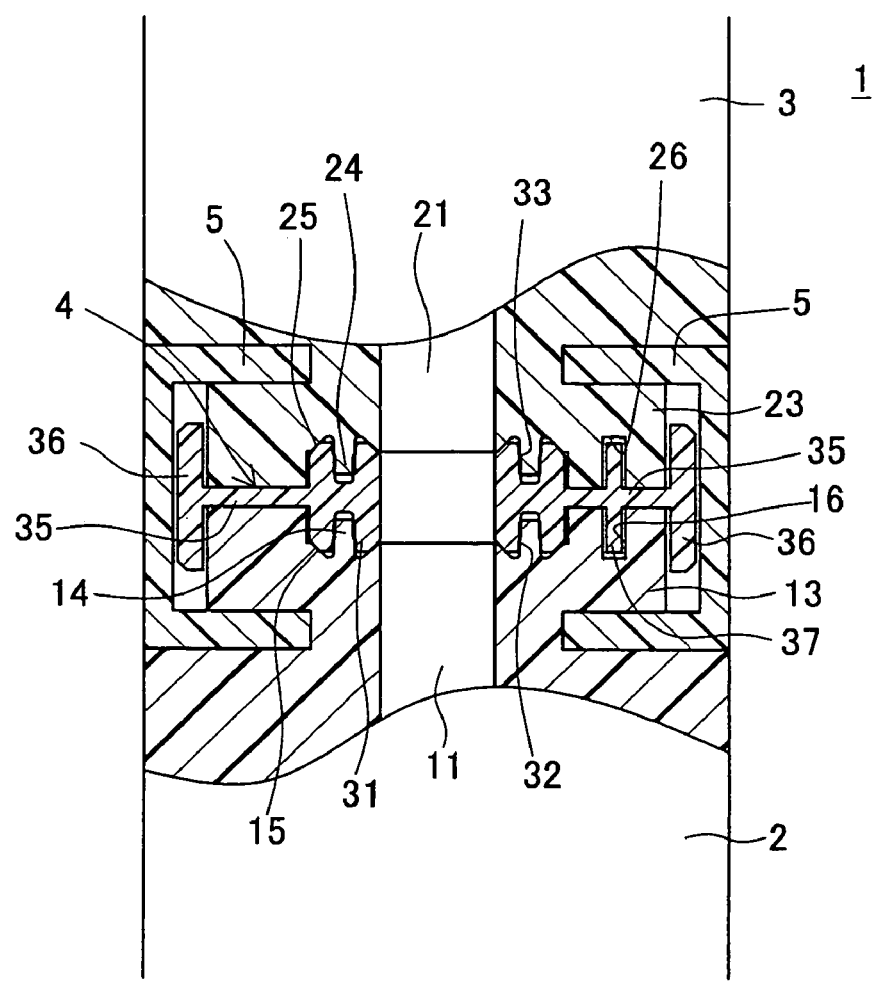
FIG. 1 is an enlarged cross-sectional view of a seal structure for connection sections according to a first embodiment of the present invention.

1 Seal structure for connection sections
2 First part
3 Second part
4 Seal member
5 Coupling member
12 Connection section
15 First groove-ridge section
16 First positioning hole
22 Connection section
25 Second groove-ridge section
26 Second positioning hole
31 Body section
32 First annular groove (First fitting portion)
33 Second annular groove (Second fitting portion)
35 Extended section
36 Holding portion
37 Positioning pin
51 Annular protrusion (First fitting portion)
52 Annular protrusion (Second fitting portion)
53 Annular groove
54 Annular groove
55 First groove-ridge section
56 Second groove-ridge section
57 Press-fitting interference
58 Guide portion
59 Guide portion
101 Seal structure for connection sections
102 First body (First part)
103 Second body (Second part)
104 First connection section
104b Annular protrusion (Groove-ridge section)
104g Protrusion (First protrusion)
105 Second connection section
105b Annular protrusion (Groove-ridge section)
105g Protrusion (Second protrusion)
106, 106A, 106B Seal member
111 Body section
111a, 111b Annular groove (Ridge-groove section)
112, 112A, 112B Holding portion
112a, 112b Hook portion
113 Extended section

DESCRIPTION OF EMBODIMENTS

A detailed description of preferred embodiments of a seal structure for connection sections embodying the present invention will now be given referring to the accompanying drawings.

First Embodiment

Figure 36:
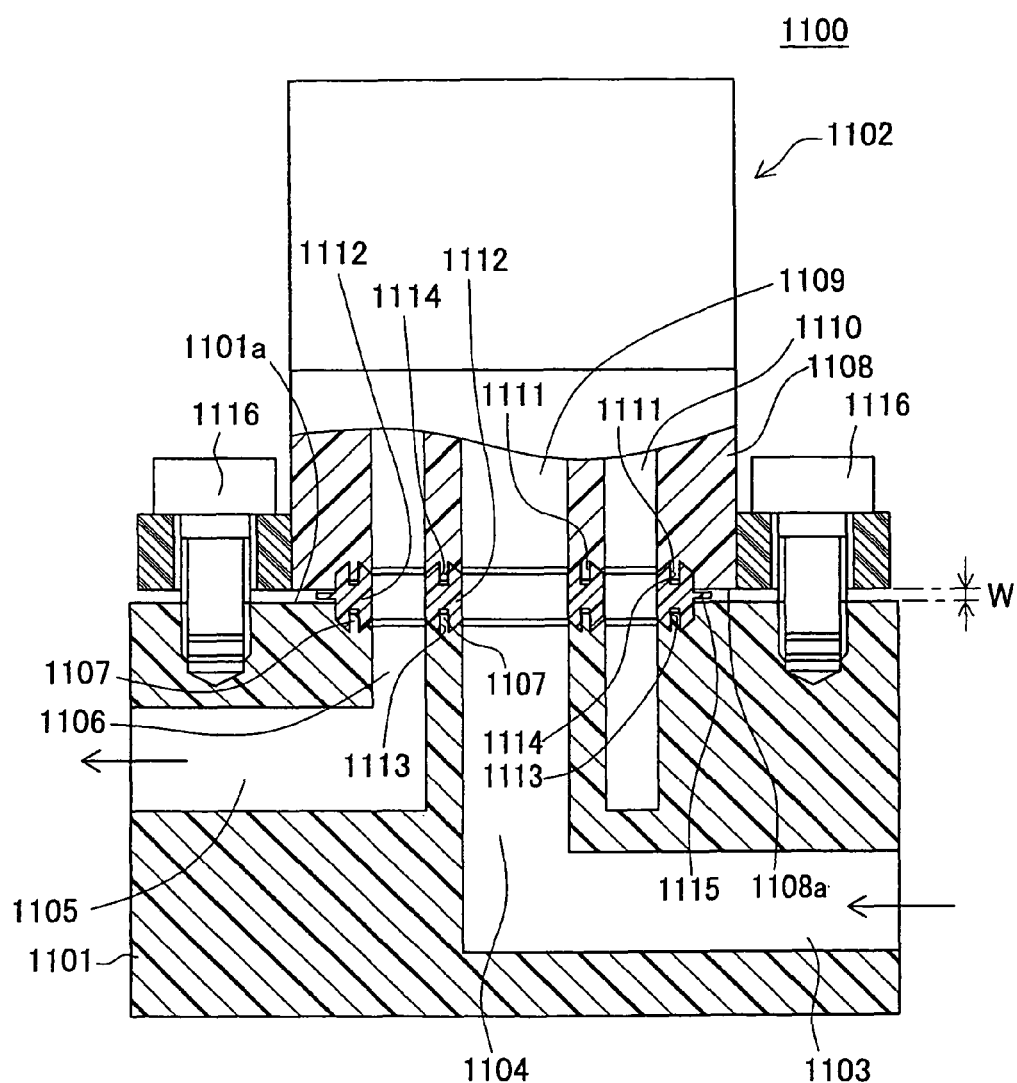
FIG. 36 is a cross-sectional view of a chemical liquid valve applying a conventional seal structure for connection sections.

A seal structure 1 for connection sections of the first embodiment is applied to various connection sections such as connection sections between the panel member 1101 and the passage block 1108 of the integrated panel 1100 shown in FIG. 36, connection sections between a fluid block and a manifold block of a fluid device for a chemical liquid valve, and connection sections between piping blocks. In addition, every member mentioned above may be an example of a first part 2 and a second part 3 described hereafter.

<Overall Configuration>

FIG. 1 is an enlarged cross-sectional view of the seal structure 1 for connection sections according to the first embodiment of the present invention.

The seal structure 1 for connection sections in the first embodiment is constituted of a first part 2, a second part 3, and a seal member 4 placed between the first and second parts 2 and 3.

In the seal structure 1 for connection sections, a pair of coupling members 5 surrounds an outer periphery of the seal member 4 to connect a connection section 12 of the first part 2 and a connection section 22 of the second part 3.

<Configuration of the First Part>

Figure 2:
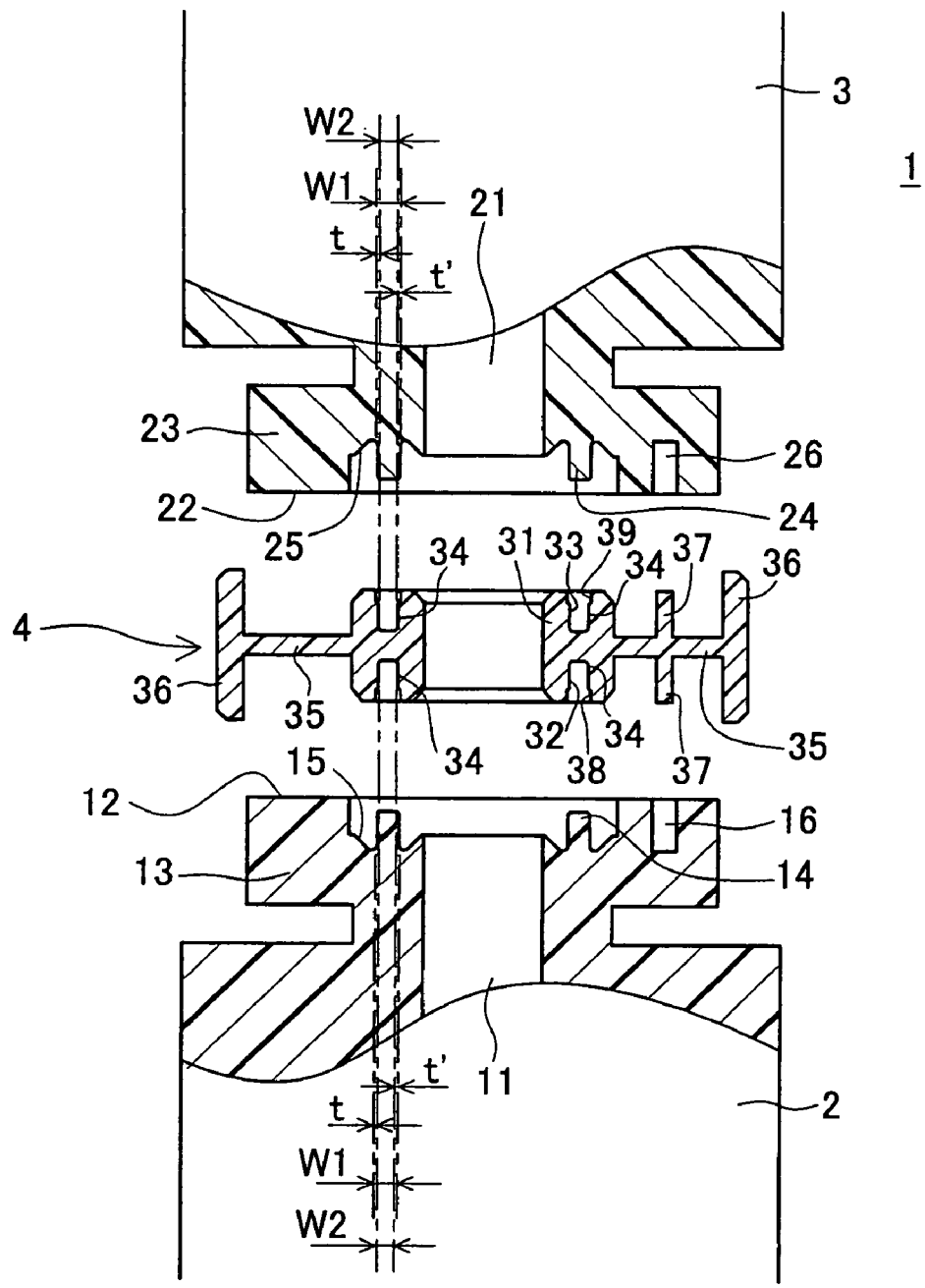
FIG. 2 is an exploded view of the seal structure for connection sections shown in FIG. 1, excepting coupling members.

FIG. 2 is an exploded view of the seal structure 1 for connection sections shown in FIG. 1, while the coupling members 5 are omitted.

The first part 2 is made of fluorocarbon resin such as PTFE and PFA. The first part 2 is formed with a first passage 11 opening on the connection section 12. The connection section 12 is formed on an end surface of a first flange 13 of the first part 2. The first flange 13 is designed to be smaller than outer dimension of the first part 2 for attaching the coupling members 5. The connection section 12 further includes a first groove-ridge section 15 having a first annular protrusion 14 annularly formed around an opening of a first passage 11. A width W1 of the first annular protrusion 14 in the thickness direction is designed equal to or slightly narrower than a width W3 of a first annular groove 32 and a second annular groove 33 of the seal member 4. The connection section 12 further includes a first positioning hole 16 formed outside the first groove-ridge section 15.

<Configuration of the Second Part>

The second part 3 is made of fluorocarbon resin such as PTFE and PFA. The second part 3 is formed with a second passage 21 opening on the connection section 22. The connection section 22 is formed on an end surface of a second flange 23 of the second part 3. The second flange 23 is designed to be smaller than outer dimension of the second part 3 for attaching the coupling members 5. The connection section 22 further includes a second groove-ridge section 25 having a second annular protrusion 24 annularly formed around an opening of the second passage 21. A width W1 of the second annular protrusion 24 in the thickness direction is designed equal to or slightly narrower than a width W3 of the first and second annular grooves 32 and 33 of the seal member 4. The connection section 22 further includes a second positioning hole 26 formed outside the second groove-ridge section 25.

In addition, the first and second parts 2 and 3 are of symmetrical configuration between the first and second flanges 13 and 23; the first and second annular protrusions 14 and 24; the first and second groove-ridge sections 15 and 25; and the first and second positioning holes 16 and 26.

<Configuration of the Seal Member>

Figure 3:
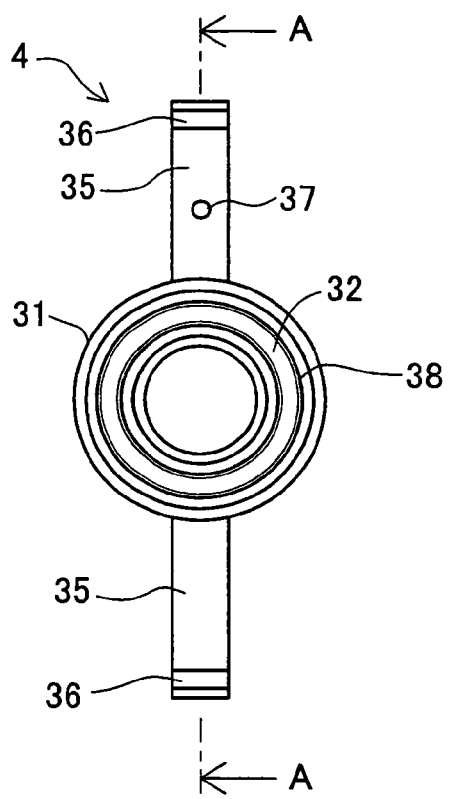
FIG. 3 is a plan view of a seal member shown in FIG. 1.
Figure 4:
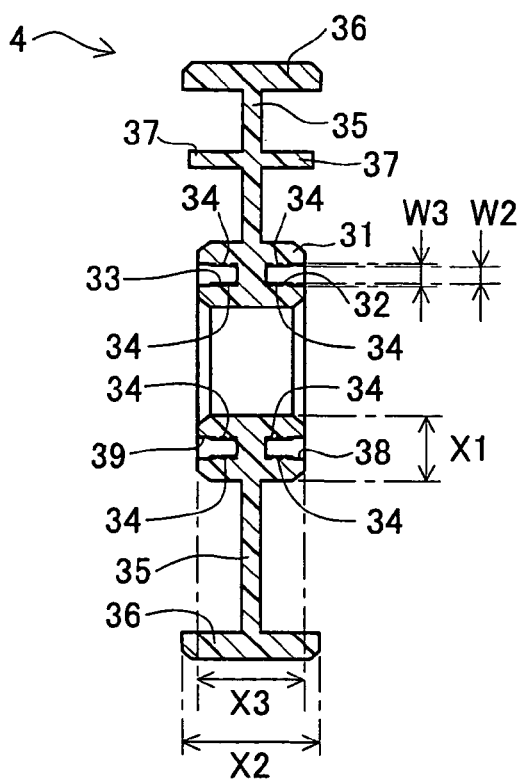
FIG. 4 is a cross-sectional view taken along a line A-A in FIG. 3.

FIG. 3 is a plan view of the seal member 4. FIG. 4 is a cross-sectional view taken along a line A-A in FIG. 3.

The seal member 4 is made of fluorocarbon resin such as PTFE and PFA. The seal member 4 has opposite end surfaces (left and right end surfaces in the figure) symmetrically shaped so that the mounting orientation with respect to the first and second parts 2 and 3 is not limited.

The seal member 4 is formed with an annular-shaped body section 31. The body section 31 has the first annular groove 32 formed on one side to be fitted with the first annular protrusion 14 of the first part 2 and the second annular groove 33 formed on the other side to be fitted with the second annular protrusion 24 of the second part 3.

In the seal member 4, the width W3 of the first and second annular grooves 32 and 33 is almost equal to or slightly wider than the width W1 of the first and second annular protrusions 14 and 24 of the first and second parts 2 and 3. Specifically, the first and second annular grooves 32 and 33 each have the width W3 which is designed to be in a range of 1 to 1.2 times wider than the width W1 of the first and second annular protrusions 14 and 24. Each inside inner wall and each outside inner wall of the first and second annular grooves 32 and 33 are formed with press-fitting interferences 34 each having a thickness t, t' in the thickness direction X1, located inward than the openings of the first and second annular grooves 32 and 33. A width W2 of each groove 32, 33 where the press-fitting interferences 34 are formed is narrower than the width W3 of the first and second annular grooves 32 and 33 (see broken lines in FIG. 4). In other words, in the seal member 4, the first and second annular grooves 32 and 33 are formed with shoulders between the openings and the press-fitting interferences 34, the shoulders creating a first guide portion 38 and a second guide portion 39 for introducing the first and second annular protrusions 14 and 24 to the press-fitting interferences 34 through the openings of the first and second annular grooves 32 and 33. The thicknesses t and t' are preferably equal for providing the same seal strength, but they actually have dimensional tolerances. The thicknesses t and t' are therefore considered separately. Additionally, the thickness of the press-fitting interference 34 is expressed by t+t'=W1−W2 (see FIG. 2).

The seal member 4 is further formed with a pair of extended sections 35, 35 radially outwardly extending from an outer peripheral wall of the body section 31. The extended sections 35 are symmetrically placed with respect to the body section 31. Each extended section 35 is of longitudinal web-like shape to be freely flexible. A thickness of each extended section 35 is determined so that the extended sections 35 have enough strength not to be broken when the seal member 4 is pulled while the first and the second annular protrusions 14 and 24 are press-fitted in the press-fitting interferences 34. Each extended section 35 has end portions protruding out of the connection sections 12 and 22 of the first and second parts 2 and 3 respectively when the seal member 4 is attached to the connection sections 12 and 22 of the first and second parts 2 and 3.

Each end portion of each extended section 35 is formed with a holding portion 36. The holding portion 36 is thicker than the extended section 35 to ensure enough strength when pinched with fingers. The holding portion 36 has an overall length X2 in the axial direction longer than an overall length X3 of the body section 31 in the axial direction, so that the holding portions 36 protrude out of both end surfaces of the seal member 4 in the axial direction. Therefore, the holding portions 36 first come to contact with other parts earlier than the body section 31 when holding the seal member 4, thereby the body section 31 and the sealing surface thereof are protected. Further, an inner distance between the holding portions 36 is the same as the outer diameter of the first and second flanges 13 and 23, so that the inner surfaces of the holding portions 36 fit against the outer peripheral surfaces of the first and second flanges 13 and 23 when the seal member 4 is attached to the first and second flanges 13 and 23. This facilitates mounting of the seal member 4 to the connection sections 12 and 22 of the first and second parts 2 and 3.

One of the extended sections 35 is provided with positioning pins 37 of a protruding pin shape. A pair of the positioning pins 37 is formed extending from both sides of the extended section 35 and in parallel with the axial direction of the body section 31 and symmetrical with respect to the extended section 35. A pair of the positioning pins 37 is formed projecting higher than the body section 31 in the axial direction and the positioning pins 37 are fitted in the first and second positioning holes 16 and 26 of the first and second parts. Thereby, the seal member 4 is appropriately positioned with respect to the first and second parts 2 and 3.

<Configuration of the Coupling Member>

In FIG. 1, a pair of the coupling members 5 is attached to the first and second parts 2 and 3, holding the first and second flanges 13 and 23 from both sides (right and left sides in the figure) with the seal member 4 placed therebetween so that the pair of the coupling members 5 surrounds the first and second flanges 13 and 23 to connect the first and second connection sections 12 and 22. In other words, the pair of the coupling members 5 presses against and covers the holding portions 36 protruding from between the first and second flanges 13 and 23.

<Installation of the Seal Member>

Figure 5:
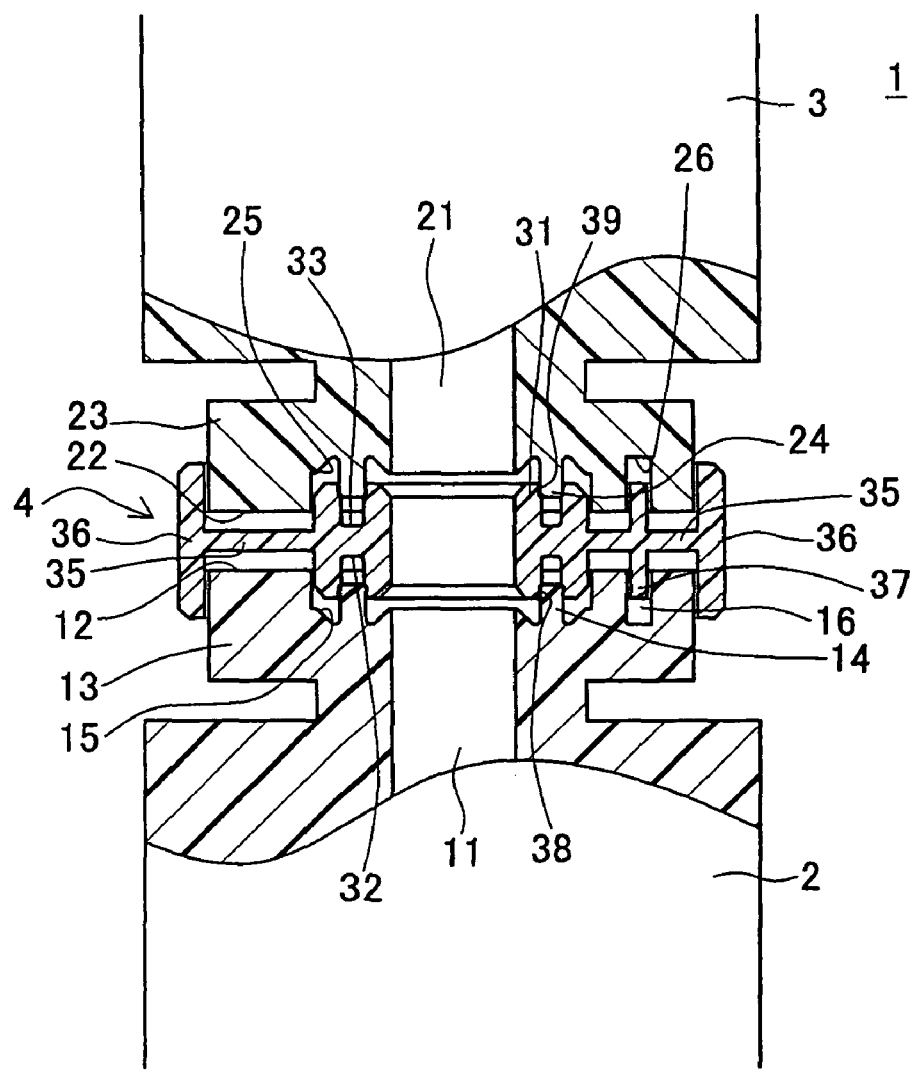
FIG. 5 is an explanatory view for mounting the seal member in the seal structure for connection sections in FIG. 1, showing a state before the seal member is mounted.
Figure 6:
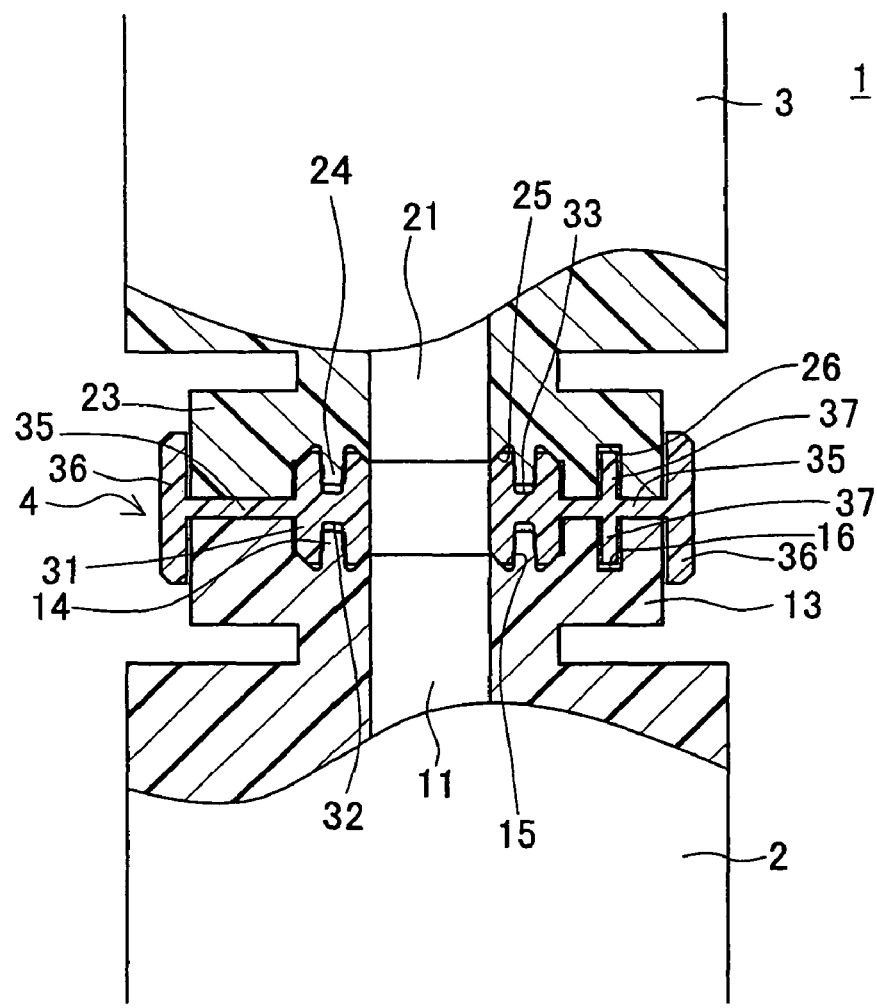
FIG. 6 is an explanatory view for mounting the seal member in the seal structure for connection sections in FIG. 1, showing a state after the seal member is mounted.

FIG. 5 is an explanatory view for installing the seal member 4 in the seal structure 1 for connection sections shown in FIG. 1 and showing a state before the seal member 4 is connected. FIG. 6 is an explanatory view for installing the seal member 4 in the seal structure 1 shown in FIG. 1, showing a state after the seal member 4 is connected.

As shown in FIG. 5, one of the positioning pins 37 of the seal member 4 is first inserted into the first positioning hole 16 of the first part 2 and then the first annular protrusion 14 of the first part 2 is inserted into the first guide portion 38 of the seal member 4. Further, the other positioning pin 37 of the seal member 4 is inserted into the second positioning hole 26 of the second part 3 and then the second annular protrusion 24 of the second part 3 is inserted into the second guide portion 39 of the seal member 4. Thereby, the connection section 12 of the first part 2 and the connection section 22 of the second part 3 are positioned relative to the body section 31 of the seal member 4 while the rotation of the seal member 4 is restricted by the positioning pins 37 inserted in the first and second positioning holes 16 and 26. As a result, the first passage 11 and the second passage 21 are coaxially disposed.

In this state, the second part 3 is pressed toward the first part 2, so that the first and second parts 2 and 3 are guided by the positioning pins 37 of the seal member 4 and coaxially moved to bring the connection sections 12 and 22 closer. In association with this action, the first annular protrusion 14 of the first part 2 and the second annular protrusion 24 of the second part 3 are press-fitted in the press-fitting interferences 34 of the first and second annular grooves 32 and 33 respectively through the first and second guide portions 38 and 39 of the seal member 4. After the first and second annular protrusions 14 and 24 are securely press-fitted in the press-fitting interferences 34 of the seal member 4, the connection sections 12 and 22 of the first and second parts 2 and 3 hold the extended sections 35 of the seal member 4 therebetween. Concurrently, the holding portions 36 formed at the ends of the extended sections 35 protrude outside the connection sections 12 and 22 of the first and second parts 2 and 3 and are positioned on outer peripheral surfaces of the first and second flanges 13 and 23.

Then, as shown in FIG. 1, the pair of the coupling members 5 is attach to and cover the first and second flanges 13 and 23 so that the holding portions 36 of the seal member 4 are not exposed outside. The coupling members 5 are integrated together by use of fixing members such as screws. The first and second flanges 13 and 23 are held between the coupling members 5, so that the connection sections 12 and 22 are maintained in a connected state even if the repulsion force of the seal member 4 occurs in a direction that separates the connection sections 12 and 22.

<Explanation for Detaching the Seal Member>

Figure 7:
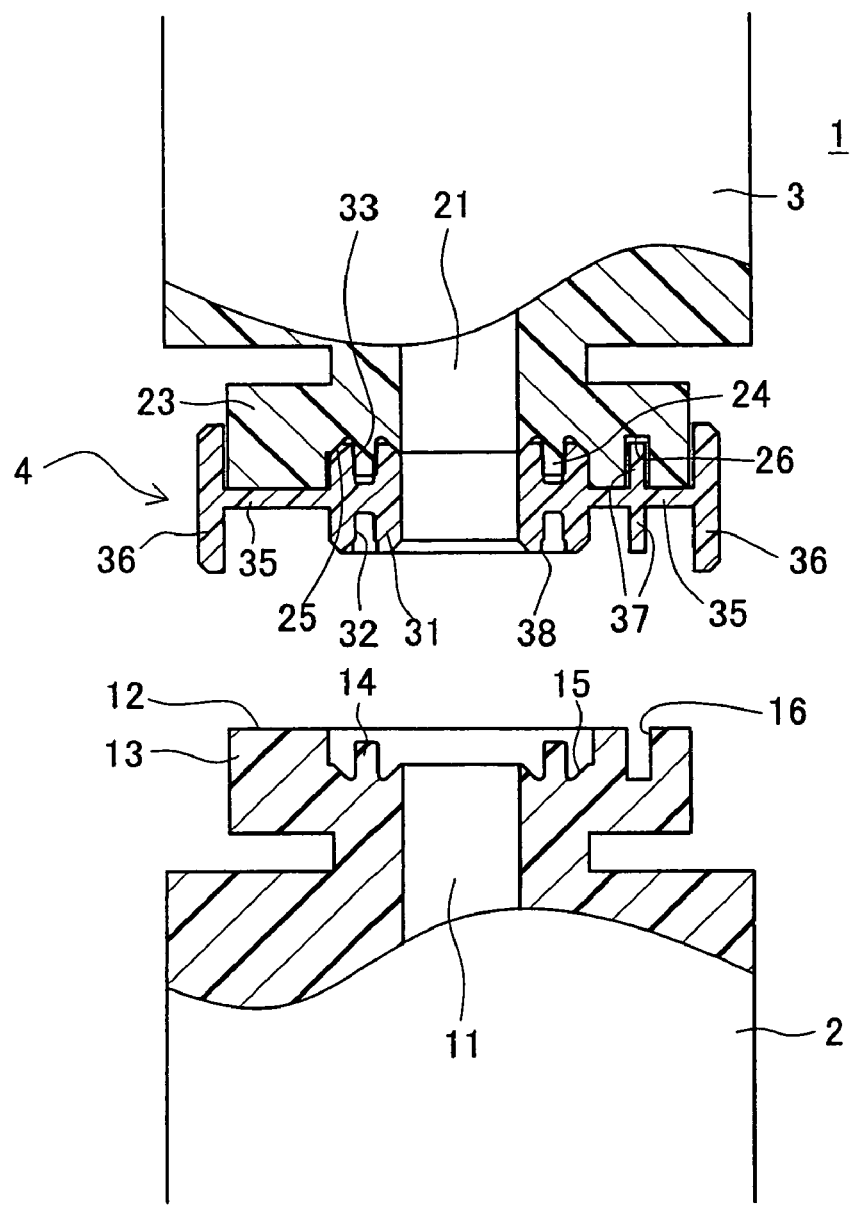
FIG. 7 is an explanatory view for detaching the seal member in the seal structure for connection sections in FIG. 1, showing a state after a first part is detached from the seal member.

FIG. 7 is an explanatory view for detaching the seal member 4 in the seal structure 1 for connection sections in FIG. 1 and showing a state after the first part is detached from the seal member.

After the pair of the coupling members 5 is detached from the first flange 13 and the second flange 23 into a state shown in FIG. 6, the first part 2 and the second part 3 are separated as shown in FIG. 7. At this time, the seal member 4 remains attached to either one of the first part 2 or the second part 3. In the first embodiment, the seal member 4 remains attached to the second part 3.

After the seal member 4 is separated from the first part 2, the body section 31, the holding portions 36, and the positioning pins 37 are exposed at their one sides. For example, when the inward (toward the body section 31) force is applied to one edge of the holding portion 36 by a thumb to tilt the holding portion 36 relative to the extended section 35, the other edge of the holding portion 36 is separated from the outer peripheral surface of the second flange 23. Subsequently, a forefinger is hooked on the other separated edge of the holding portion 36 to firmly hold and pull the holding portion 36. Since the overall length X2 of the holding portion 36 is longer than the overall length X3 of the body section 31, the other edge of the holding portion 36 is largely separated by pressing one edge thereof, making it easy to pinch the holding portion 36. Further, each holding portion 36 has a wide holding area, so that each holding portion 36 is less slippery when the seal member 4 is pulled with fingers.

In addition, the seal member 4 is formed with two rectangular extended sections 35 provided on an outer wall of the seal member 4, and therefore the seal member 4 comes into close contact with the connection sections 12 and 22 only through a contact area of each extended section 35 when the seal member 4 is placed between the connection sections 12 and 22. Therefore, even if each extended section 35 has an enough thickness to be tightly held by the connection sections 12 and 22, each extended section 35 can be easily separated from the connection section 22 when each holding portion 36 is unstuck to the opposite side from the second part 3.

Figure 8:
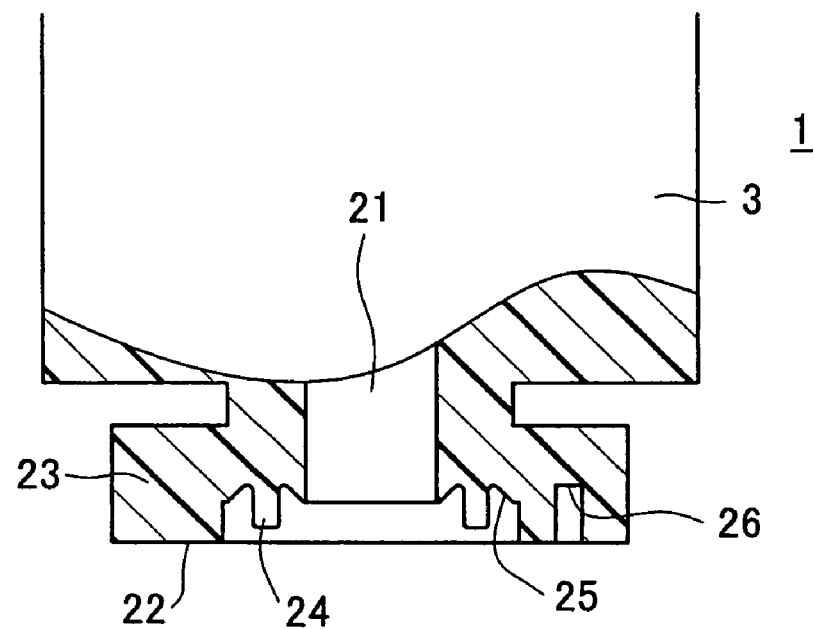
FIG. 8 is an explanatory view for detaching the seal member in the seal structure for connection sections in FIG. 1, showing a state after a second part is detached from the seal member.
Figure 8:
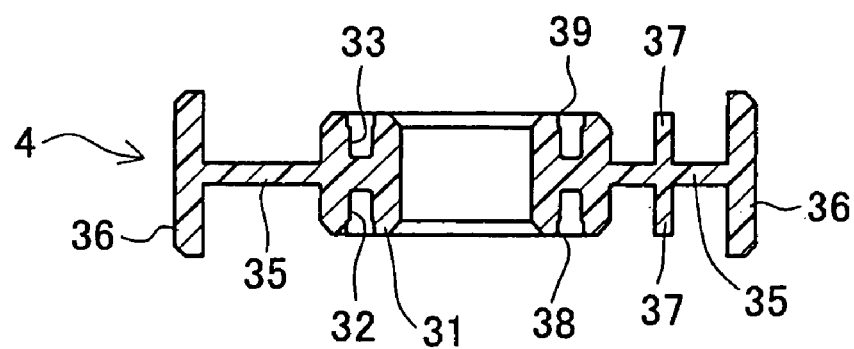

In the seal member 4, the holding portions 36 of the extended sections 35 formed in alignment with each other about the body section 31 are pulled by almost the same the force. Therefore, the pulling force disperses over the seal member 4 and thus the extended sections 35 are hard to be torn off when the holding portion 36 is pulled. After pulling the holding portions 36, thereby releasing the fitted relation of the second annular groove 33 and the second annular protrusion 24, the seal member 4 is detached from the second groove-ridge section 25 of the second part 3 as shown in FIG. 8.

As a consequence, the seal member 4 can be detached from the connection sections 12 and 22 of the first and second parts 2 and 3 by hand without using tools. Therefore, the connection sections 12 and 22 of the first and second parts 2 and 3 do not get any scratches during detachment of the seal member 4. Further, the seal member 4 does not get any scratches by tools, either. Because the extended sections 35 of the seal member 4 has enough strength, the extended sections 35 can be prevented from becoming torn off or broken when the extended sections 35 are pinched and pulled with fingers to detach the seal member 4 from the connection sections 12 and 22 of the first and second parts 2 and 3. As a result, in the seal structure 1 of the first embodiment, the seal member 4 and the first and second parts 2 and 3 are hard to be scratched during the detachment of the seal member 4, so that the seal member 4 can be repeatedly attached to and detached from the first and second parts 2 and 3.

<Attachment of the Seal Member>

In a case that the seal member 4 is attached between the first part 2 and the second part 3, attaching may be done in the reverse order from the above mentioned detachment steps.

For attaching the seal member 4, the holding portions 36 formed on the ends of the extended sections 35 are first held by fingers. The first annular groove 32 or the second annular groove 33 is aligned with the first annular protrusion 14 of the first part 2 or the second annular protrusion 24 of the second part 3 so that a leading end of the first annular protrusion 14 or the second annular protrusion 24 is inserted into the guide portion 38 of the first annular groove 32 or the guide portion 39 of the second annular groove 33. In this way, the seal member 4 can be easily attached to the connection section 12 of the first part 2 or the connection section 22 of the second part 3.

Moreover, the holding portions 36 protrude higher than the end surfaces of the body section 31 in the axial direction. Therefore, before the leading end of the first annular protrusion 14 or the second annular protrusion 24 is inserted into the guide portion 38 of the first annular groove 32 or the guide portion 39 of the second annular groove 33, the holding portions 36 are brought into contact with the outer peripheral surface of the first flange 13 or the second flange 23, thereby positioning the guide portion 38 or 39 of the first or second annular groove 32 or 33 relative to the leading end of the first or second annular protrusion 14 or 24. The holding portions 36 move along the first or second flange 13 or 23, functioning to guide the leading end of the first or second annular protrusion 14 or 24 into the guide portion 38 or 39 of the first or second annular groove 32 or 33. Consequently, the seal member 4 can be easily attached to the connection section 12 or 22 of the first or second part 2 or 3.

<Operations and Effects>

In the seal structure 1 for connection sections of the above mentioned first embodiment, the seal member 4 remains attached to either one of the first part 2 or the second part 3 after the first and second parts 2 and 3 are separated, and the extended sections 35 of the seal member 4 are extended outside the connection section 12 of the first part 2 or the connection section 22 of the second part 3 (see FIG. 7). Since the extended section 35 has an appropriate thickness so as to be held by the first and second parts 2 and 3, even if the extended sections 35 remain attached to the connection section 12 of the first part 2 or the connection section 22 of the second part 3 after the first and second parts 2 and 3 are separated, the extended sections 35 can be separated from the connection section 12 of the first part 2 or the connection section 22 of the second part 3 by holding the holding portion 36 and the seal member 4 can be easily pulled and detached from the first or second part 2 or 3 by firmly holding holding portion 36. The extended section 35 also has enough strength not to be torn off while the extended section 35 is pulled. Consequently, according to the seal structure 1 of the first embodiment, the seal member 4 placed between the connection section 12 of the first part 2 and the connection section 22 of the second part 3 can be easily detached. Moreover, according to the seal structure 1 of the first embodiment, the body section 31 is attached to the connection section 12 of the first part 2 or the connection section 22 of the second part 3 by holding the holding portions 36 formed end portion of the extended section 35, so that the seal member 4 is easily attached to the connection sections 12 and 22 even if, for example, the seal member 4 is very small and hard to be handled.

In the above-mentioned seal structure 1 for connection sections, the holding portions 36 are formed at the ends of the extended sections 35 extending outside the connection section 12 of the first part 2 and the connection section 22 of the second part 3 to provide a wide holding region (see FIG. 7). Accordingly, the holding portions 36 are hard to be slipped off the fingers when the seal member 4 is to be detached from the first part 2 or the second part 3 by pulling the holding portions 36.

In the above seal structure 1, the positioning pins 37 of the seal member 4 are fitted in the first positioning hole 16 of the first part 2 and the second positioning hole 26 of the second part 3 to position the seal member 4 with respect to the first and second parts 2 and 3 (see FIG. 5). Therefore, the seal member 4 is easily mounted.

In the above seal structure 1, the openings of the first annular groove 32 and the second annular groove 33 are formed with the guide portions 38 and 39 respectively for guiding the first and second annular protrusions 14 and 24 formed on the first and second groove-ridge sections 15 and 25 to the press-fitting interferences 34 (see FIG. 5). Thereby, the first and second annular protrusions 14 and 24 are easily press-fitted in the press-fitting interferences 34 of the first and second annular grooves 32 and 33, so that the seal member 4 is effectively mounted.

Second Embodiment

The second embodiment of the present invention will be explained with reference to the drawings.

In the seal member of the first embodiment, the holding portions attached to the first and second resin parts are not so wide in order to provide a compact seal connection section. Therefore, for example, after the holding portions are fitted with the connection section of the second resin part to temporarily mount the seal member to the second resin part, the seal member sometimes falls off the second resin part due to the weight of the seal member itself or due to outer impacts before the first resin part is temporarily attached to the seal member. Thus fallen seal member could be deformed or damaged. As long as the seal member keeps annular grooves thereof in normal shape relative to annular protrusions, the annular protrusions can be evenly press-fitted in the annular grooves in the circumferential direction and the connection sections can be appropriately sealed. However, in case the seal member has the improperly deformed or damaged annular grooves relative to the annular protrusions, the annular protrusions are not able to be evenly press-fitted in the annular grooves in the circumferential direction and there is a possibility to cause fluid leakage in the region where is less sealed.

Figure 9:
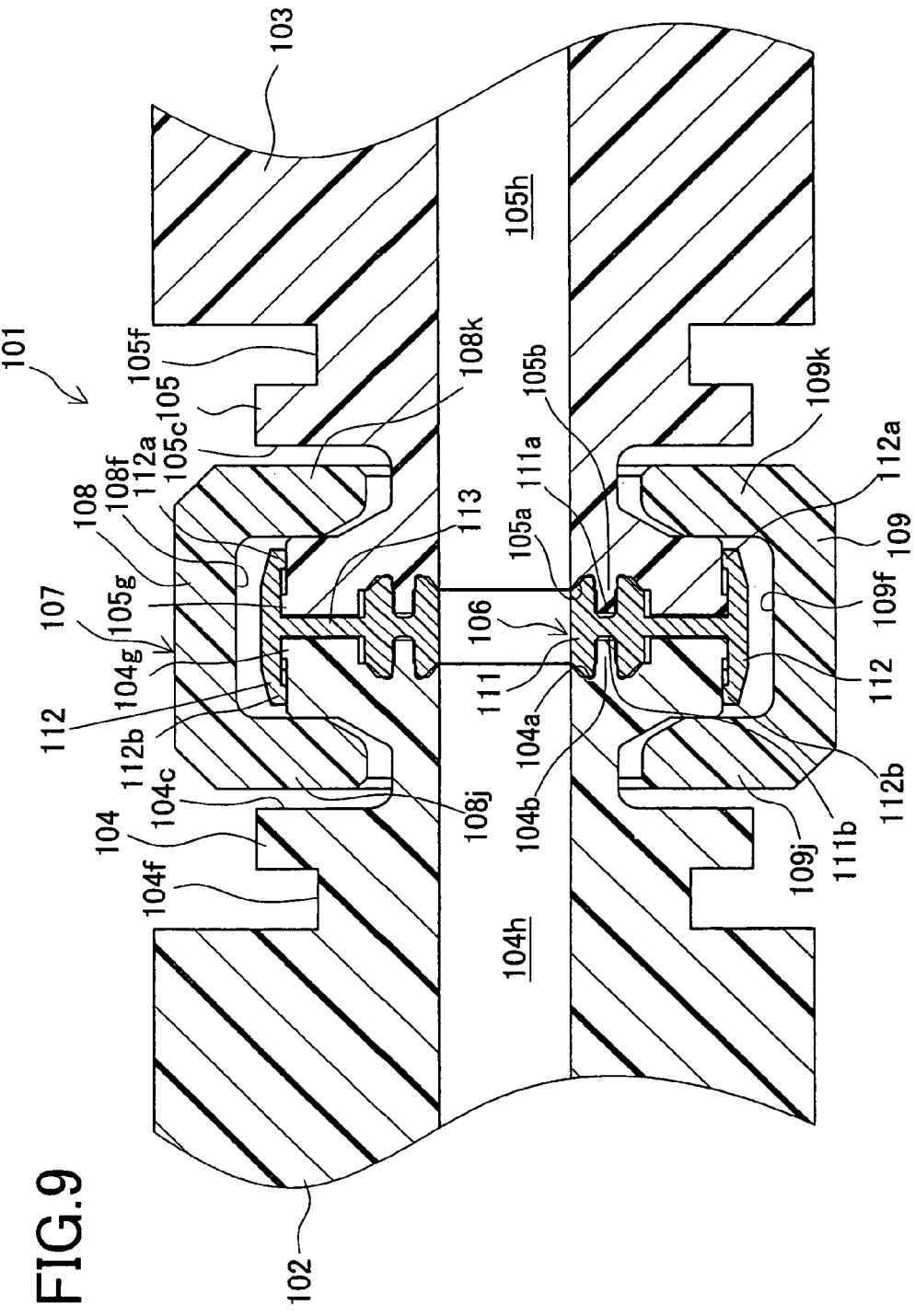
FIG. 9 is a cross-sectional view of a seal structure for connection sections according to a second embodiment of the present invention.

FIG. 9 is a cross-sectional view of a seal structure 101 for connection sections.

The seal structure 101 for connection sections and a seal member 106 used therein in the second embodiment have been developed for solving the problem caused by the seal member and the seal structure for connection sections using the seal member of the first embodiment. The seal member 106 has hook portions 112a and 112b for preventing the seal member 106 from falling off a first connection section 104 or a second connection section 105 during the operation of connecting the first and second connection sections 104 and 105.

<Overall Configuration of the Seal Structure for Connection Sections>

The seal structure 101 for connection sections of the second embodiment is, for example, applied for connection sections between a first body 102 of a first fluid device (one example of "a first part") and a second body 103 of a second fluid device (one example of "a second part") which are used in a semiconductor manufacturing process. The seal structure 101 includes the seal member 106 placed between the first connection section 104 of the first body 102 and the second connection section 105 of the second body 103 and a coupling member 107 for connecting the first and second connection sections 104 and 105.

The first and second bodies 102 and 103 are made of fluorocarbon resin such as PTFE with thermal resistance and corrosion resistance, forming into block-like shape. The first body 102 is formed with the cylindrical first connection section 104 having an end surface on which a passage 104h opens and the second body 103 is formed with the cylindrical second connection section 105 having an end surface on which a passage 105h opens. The first and second connection sections 104 and 105 have identical structure.

On the end surfaces of the first and second connection sections 104 and 105, sealing grooves 104a and 105a are formed around the passage openings. The sealing grooves 104a and 105a are formed with annular protrusions 104b and 105b as one example of "annular groove-ridge sections," protruding coaxially with the passages 104h and 105h. On outer peripheral surfaces of the first and second connection sections 104 and 105, protrusions 104g and 105g are annularly formed in a protruding manner. On the outer peripheral surfaces of the thus configured connection sections 104 and 105, first and second mounting grooves 104f and 105f are annularly formed for mounting a jig 115 which will be described later. The first connection section 104 is further formed with a first attaching groove 104c annularly formed between the end surface of the connection section 104 and the first mounting groove 104f for attaching the coupling member 107. The second connection section 105 is further formed with a second attaching groove 105c annularly formed between the end surface of the connection 105 and the second mounting groove 105f for attaching the coupling member 107.

The coupling member 107 is separable into a first divided part 108 and a second divided part 109. The first and second divided parts 108 and 109 are integrally assembled by a not-shown fixing member to maintain the connected state of the first and second connection sections 104 and 105. The first and second divided parts 108 and 109 have semi-circular arcuate surfaces for attaching to the outer peripheries of the first and second connection sections 104 and 105. On each semi-circular arcuate surfaces of the first and second divided parts 108 and 109, projections 108j, 108k, 109j, and 109k are formed inwardly protruding. The surfaces of the first and second divided parts 108 and 109 are further formed with a first holding groove 108f between the projections 108j and 108k and a second holding groove 109f between the projections 109j and 109k, respectively.

<Seal Member>

Figure 10:
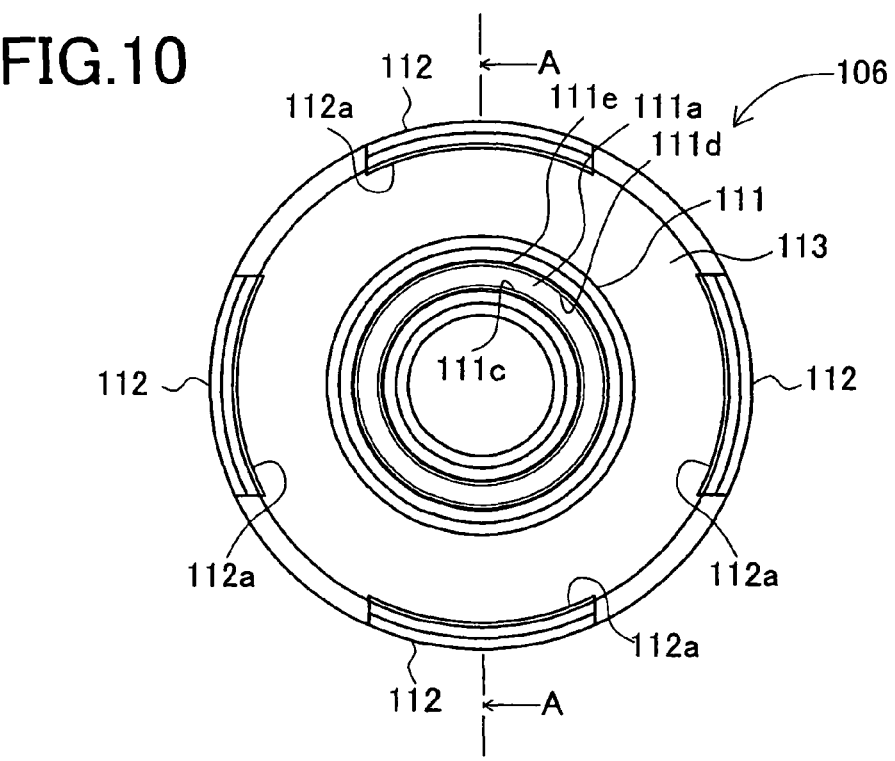
FIG. 10 is a plan view of the seal member shown in FIG. 9.
Figure 11:
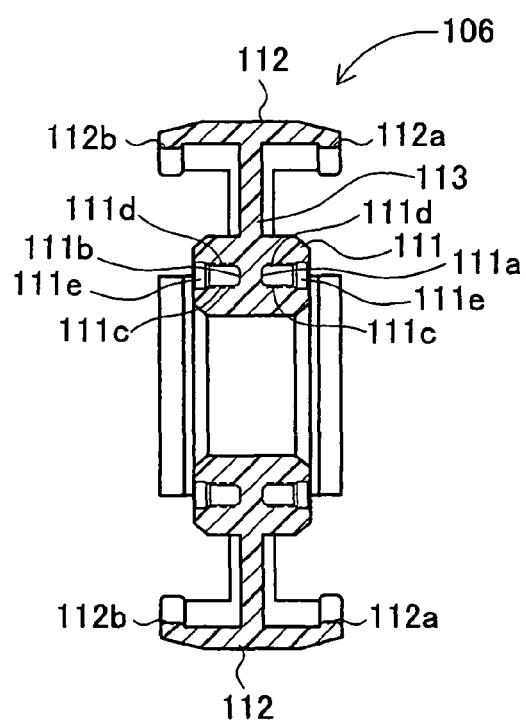
FIG. 11 is a cross-sectional view taken along a line A-A in FIG. 10.
Figure 12:
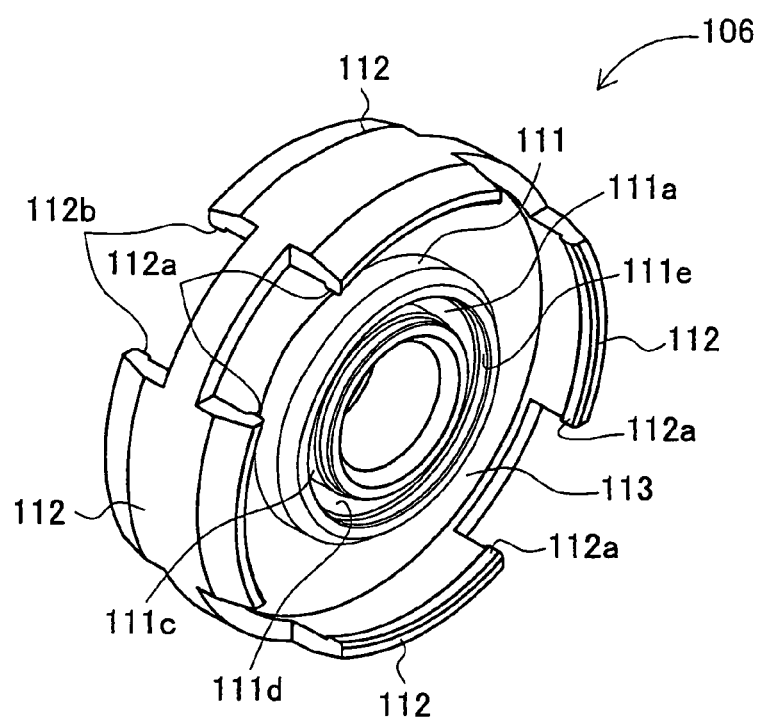
FIG. 12 is an external perspective view of the seal member shown in FIG. 10.
Figure 13:
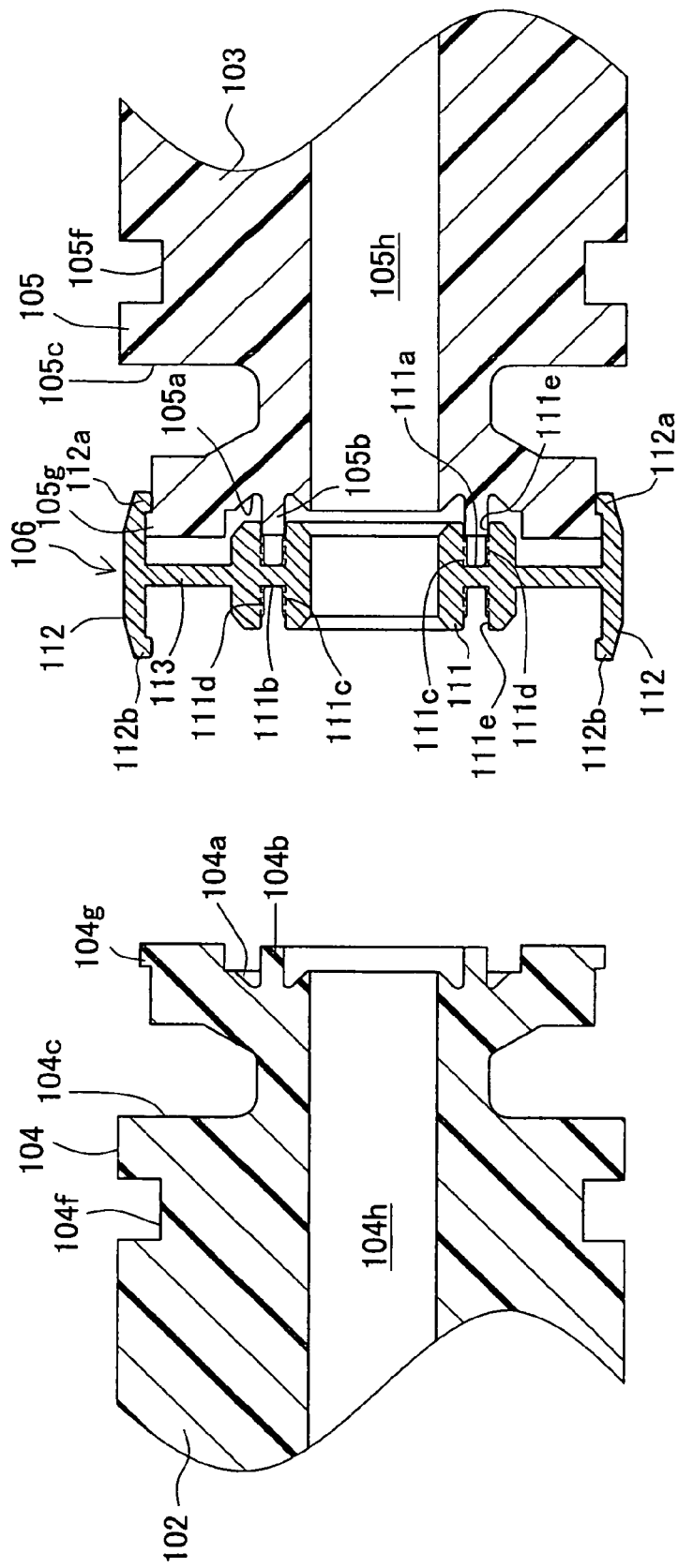
FIG. 13 is an explanatory view for assembling the seal structure for connection sections shown in FIG. 9, especially showing a state that the seal member is mounted to either one of connection sections.

FIG. 10 is a plan view of the seal member 106 shown in FIG. 9. FIG. 11 is a cross-sectional view taken along a line A-A in FIG. 10. FIG. 12 is an external perspective view of the seal member 106 shown in FIG. 10. FIG. 13 is an explanatory view for assembling the seal structure 101 shown in FIG. 9, especially showing a state that the seal member 106 is mounted to one connection section 105.

The seal member 106 is made of resin with hardness and corrosion resistance such as PFA (tetrafluoroethylene perfluoro alkyl vinyl ether copolymer). As shown in FIGS. 10 to 12, the seal member 106 is formed with a body section 111, holding portions 112, and an extended section 113.

As shown in FIGS. 10 to 12, the body section 111 is of short cylindrical shape. The body section 111 has annular grooves 111a and 111b (examples of "ridge-groove sections") on both end surfaces of the body section 111 to be fitted with the annular protrusions 104b and 105b of the first and second connection sections 104 and 105. Thus, the body section 111 has H-shaped cross section having a line symmetry.

Each groove width of the annular grooves 111a and 111b in FIG. 11 is designed equal to or slightly wider than the width of the annular protrusions 104b and 105b of the first and second connection sections 104 and 105 in the thickness direction (see FIG. 9). Each inside inner wall and outside inner wall of the annular grooves 111a and 111b are formed with press-fitting interferences 111c and 111d located inward than the openings of the first and second annular grooves 111a and 111b respectively. Specifically, widths of portions of the annular grooves 111a and 111b far from the openings are determined narrower than the widths of the annular protrusions 104b and 105b in the thickness direction. Therefore, in the openings of the annular grooves 111a and 111b, guide portions 111e are provided for guiding the annular protrusions 104b and 105b respectively.

The body section 111 is, as shown in FIG. 11, formed with tapered inner and outer peripheral surfaces corresponding to tapers formed on bottoms of the sealing grooves 104a and 105a (see FIG. 9). This prevents each width of the annular grooves 111a and 111b of the seal member 106 from increasing and hence prevents the sealing performance from decreasing when the annular protrusions 104b and 105b of the connection sections 104 and 105 are press-fitted in the annular grooves 111a and 111b of the body section 111.

As shown in FIGS. 10 to 12, outer peripheral surface of the body section 111 is formed with an extended section 113 extending outwardly. The extended section 113 is shaped annularly along the outer peripheral surface of the body section 111. On the outer edge of the extended section 113, a plurality of holding portions 112 are integrally formed at predetermined intervals. Each holding portion 112 is formed extending from both sides of the edge of the extended section 113 in the direction orthogonal to the extended section 113. In other words, each holding portion 112 is formed in parallel with the outer peripheral surface of the body section 111 and spaced at predetermined intervals. On both ends of each holding portion 112, the hook portions 112a and 112b to be hooked on the protrusions 104g and 105g of the first and second connection sections 104 and 105 are formed protruding toward the body section 111 (inwardly). The hook portions 112a and 112b are provided in each holding portion 112 so that, when the hook portions 112a and 112b are engaged with the protrusions 104g and 105g of the first and second connection sections 104 and 105, the leading ends of the annular protrusions 104b and 105b of the first and second connection sections 104 and 105 are temporarily inserted into the guide portions 111e, thereby properly positioning the annular protrusions 104b and 105b with respect to the annular grooves 111a and 111b.

The seal member 106 is formed by injection molding into a shape shown in FIGS. 10 to 12. The hook portions 112a and 112b as undercuts are easy to be removed from a die and the seal member 106 is easy to be removed from the die since the divided holding portions 112 are easily deformable.

<Fluid Devices Connection Method>

Figure 14:
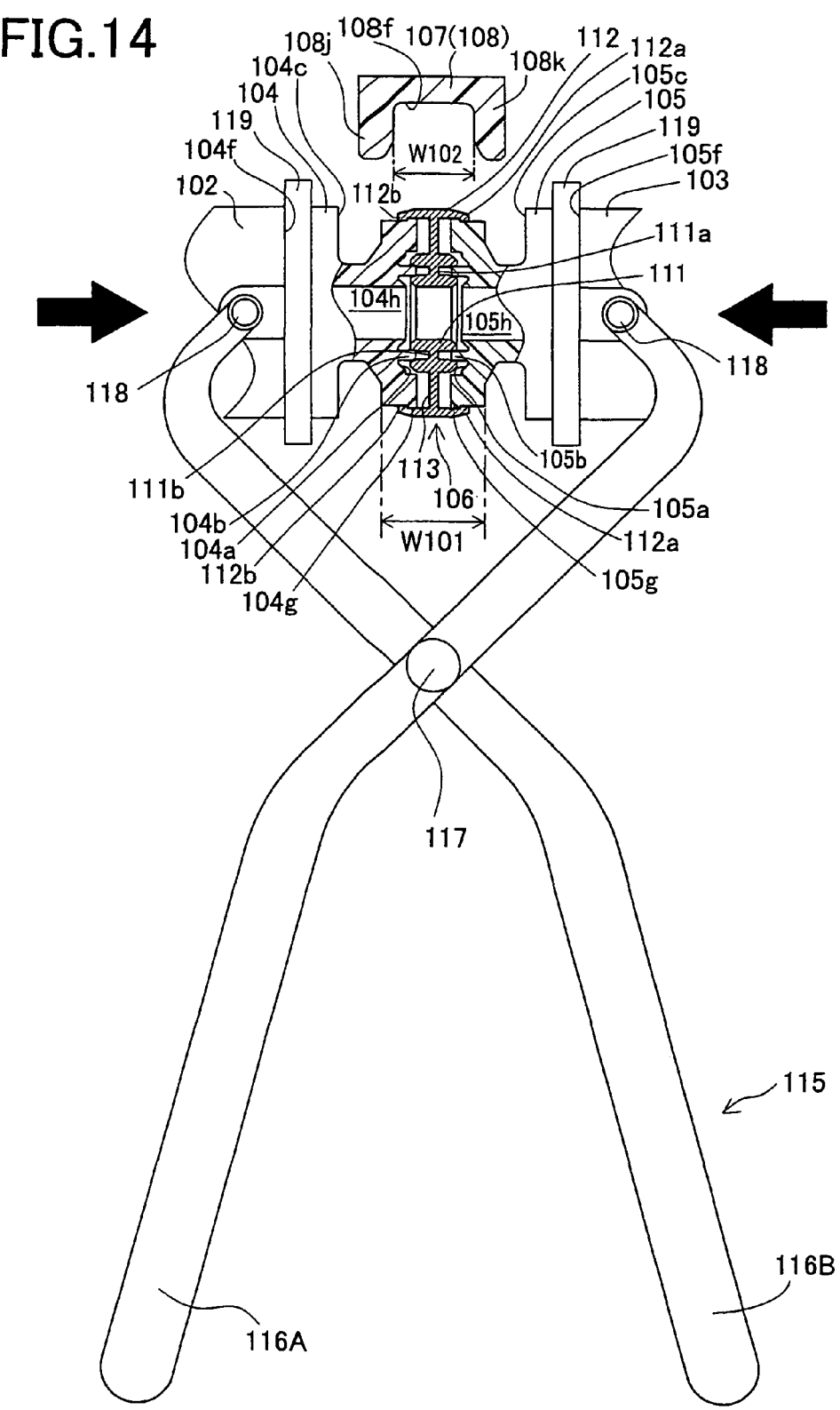
FIG. 14 is an explanatory view for assembling the seal structure for connection sections shown in FIG. 9, especially showing a method of holding and drawing fluid devices.
Figure 15:
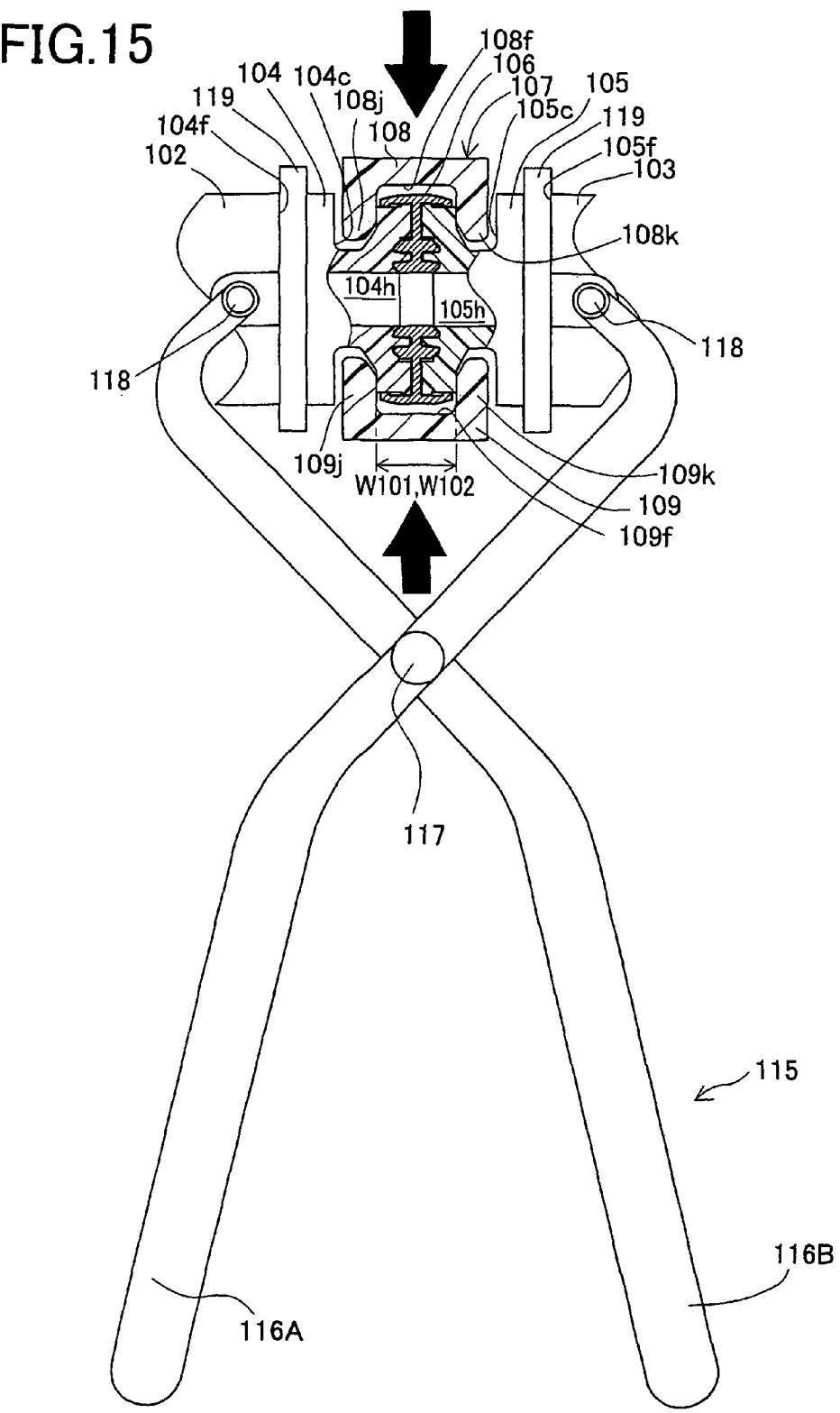
FIG. 15 is an explanatory view for assembling the seal structure for connection sections shown in FIG. 9, especially showing a method of mounting a coupling member.

A method for connecting the first body 102 of the first fluid device and the second body 103 of the second fluid device is now explained. FIG. 13 is an explanatory view for assembling the seal structure 101 for connection sections shown in FIG. 9, especially showing a state that the seal member 106 is mounted to one connection section 105. FIG. 14 is an explanatory view for assembling the seal structure 101 for connection sections shown in FIG. 9, especially showing a method for drawing or clamping the fluid devices. FIG. 15 is an explanatory view for assembling the seal structure 101 for connection sections shown in FIG. 9, especially showing a method for attaching the coupling member 107.

One of the holding portions 112 of the seal member 106 is first pinched by hand wearing a glove and, as shown in FIG. 13, the hook portion 112a of the seal member 106 is, for example, hooked on the protrusion 105g of the second connection section 105 to attach the holding portion 112 to the outer periphery of the second connection section 105 and thereby the seal member 106 is temporarily held on the second connection section 105. An operator uses the glove in this operation for preventing adhesion of foreign matters on the sealing surfaces and preventing one's hand from touching chemical liquids and others sticking to the passages 104h and 105h. Since the seal member 106 includes the divided holding portions 112 spaced from each other, the holding portions 112 are deformable and the hook portions 112a are not formed on the entire periphery of the seal member 106. Therefore, the hook portion 112a is easily hooked on the protrusion 105g, so that the seal member 106 can be easily attached to the second connection section 105. The thus engaged seal member 106, having the hook portion 112a hooked on the protrusion 105g, does not wobble because the leading end of the annular protrusion 105b of the second connection section 105 is temporarily inserted into the guide portions 111e provided in the opening of the annular groove 111a. Accordingly, the annular groove 111a and the annular protrusion 105b are properly positioned without causing scratches on the sealing surface (the press-fitting interferences 111c and 111d and the annular protrusion 105b). In addition, since the hook portion 112a is hooked on the protrusion 105g, the seal member 106 keeps the annular groove 111a and the annular protrusion 105b in a proper position and does not fall off the second connection section 105 even if the second body 103 is tilted. Consequently, the seal member 106 is easy to be handled.

Subsequently, the seal member 106 is attached to the first connection section 104 by hooking the hook portion 112b on the protrusion 104g in the same manner as mentioned above. Thus, the annular groove 111b is positioned with respect to the annular protrusion 104b without causing scratches on the sealing surface.

By use of the holding jig 115 shown in FIG. 14, the first and second bodies 102 and 103 are drawn closer to each other and the annular protrusions 104b and 105b of the first and second connection sections 104 and 105 are press-fitted in the press-fitting interferences 111c and 111d of the seal member 106. Specifically, the holding jig 115 has two handles 116A and 116B rotatably jointed via a spindle 117. Distal ends of the handles 116A and 116B are formed with pressurizing plates 119 movable via spindles 118 respectively. The holding jig 115 is manipulated to adjust a distance between the handle 116A and the handle 116B so that the pressurizing plates 119 are attached to the first and second mounting grooves 104f and 105f. At this time, a distance W101 between an inner wall of the first attaching groove 104c closer to the end surface and an inner wall of the second attaching groove 105c closer to the end surface is wider than a width W102 of the holding groove 108f of the coupling member 107 (a distance between the first projection 108j and the second projection 108k). The coupling member 107 is therefore not allowed to be mounted on the first and second connection sections 104 and 105. Accordingly, as indicated with arrows in the figure, the handles 116A and 116B of the holding jig 115 are grasped and operated to draw the first and second connection sections 104 and 105 closer to each other to press-fit the annular protrusions 104b and 105b of the first and second connection sections 104 and 105 in the press-fitting interferences 111c and 111d of the seal member 106. At this time, the annular protrusions 104b and 105b are guided to the press-fitting interferences 111c and 111d via the guide portions 111e of the seal member 106 in which the leading ends of the annular protrusions 104b and 105b have been temporarily inserted, so that the annular protrusions 104b and 105b are evenly press-fitted in the press-fitting interferences 111c and 111d in the circumferential direction.

As shown in FIG. 15, the connection sections 104 and 105 are clamped and drawn by the holding jig 115 to come closer to each other until the distance W101 becomes equal to or narrower than the width W102 of the holding groove 108f. Then, the annular protrusions 104b and 105b of the connection sections 104 and 105 are press-fitted in the press-fitting interferences 111c and 111d of the seal member 106 by a prescribed amount and a predetermined sealing strength is attained. By grasping the holding jig 115 to maintain the connected state of the first and second connection sections 104 and 105, the projections 108j and 108k of the first divided part 108 and the projections 109j and 109k of the second divided part 109 are fitted in the first and second attaching grooves 104c and 105c of the first and second connection sections 104 and 105 respectively to fix the first and second divided parts 108 and 109 with not-shown fixing members. Even if the first and second connection sections 104 and 105 are about to separate from each other due to the repulsive force of the seal member 106, the coupling member 107 receives that force at the first and second projections 108j, 108k, 109j, and 109k and thus can maintain the connection between the first and second connection sections 104 and 105. As a consequence, the seal member 106 has the annular grooves 111a and 111b in which the annular protrusions 104b and 105b of the first and second connection sections 104 and 105 are press-fitted by the prescribed amount to keep the predetermined sealing strength in the press-fitted region.

<Operations and Effects>

In the seal structure 101 for connection sections and the seal member 106 of the second embodiment, when the first connection section 104 of the first body 102 and the second connection section 105 of the second body 103 are connected, the hook portions 112a and 112b are hooked on the first and second protrusions 104g and 105g respectively to prevent the seal member 106 from falling off so as not to be deformed and damaged. Thereby, the annular protrusion 104b of the first connection section 104 and the annular groove 111a of the seal member 106 are evenly press-fitted in the circumferential direction and the annular protrusion 105b of the second connection section 105 and the annular groove 111b of the seal member 106 are evenly press-fitted in the circumferential direction, thus precluding the fluid leakage. Therefore, according to the seal structure 101 for connection sections and the seal member 106 of the second embodiment, the connected portion of the first and second connection sections 104 and 105 formed in the first and second bodies 102 and 103 can be surely sealed.

In the seal structure 101 for connection sections and the seal member 106 of the second embodiment, for example hooking the hook portion 112a on the second protrusion 105g allows the annular protrusion 105b of the second connection section 105 and the annular groove 111a of the seal member 106 to be properly positioned while preventing the seal member 106 from falling off the second connection section 105. Thereby, the press-fitted region between the annular protrusion 105b and the annular groove 111a is not misaligned, thus precluding the fluid leakage. Therefore, according to the seal structure 101 for connection sections and the seal member 106 of the second embodiment, the connected region of the first and second connection sections can be surely sealed.

Especially, in the seal structure 101 for connection sections and the seal member 106 of the second embodiment, when the hook portion 112a is hooked on the first protrusion 104g, the leading end of the annular protrusion 104b is temporarily inserted in the guide portion 111e formed in the annular groove 111a. Similarly, when the hook portion 112b is hooked on the second protrusion 105g, the leading ends of the annular protrusion 105b is temporarily inserted in the guide portion 111e formed in the annular groove 111b. Thus, at the time the first and second connection sections 104 and 105 of the first and second bodies 102 and 103 are brought closer to each other to press-fit the annular protrusions 104b and 105b in the annular grooves 111a and 111b, the annular protrusions 104b and 105b are smoothly introduced from the guide portions 111e of the annular grooves 111a and 111b to the press-fitting interferences 111c and 111d. Therefore, the annular protrusions 104b and 105b are evenly press-fitted in the press-fitting interferences 111c and 111d of the annular grooves 111a and 111b, achieving the appropriate sealing performance.

In the seal structure 101 for connection sections and the seal member 106 of the second embodiment, the divided holding portions 112 are spaced from each other and hence deformable. Therefore, the hook portions 112a and 112b are easily hooked on the first and second protrusions 104g and 105g.

In the seal structure 101 for connection sections and the seal member 106 of the second embodiment, both ends of each holding portion 112 are formed with the hook portions 112a and 112b, so that the mounting orientation to mount the seal member 106 to the first and second connection sections 104 and 105 is not limited.

In the seal structure 101 for connection sections and the seal member 106 of the second embodiment, the holding portions 112 are pinched by gloved hand when replacing the seal member 106, so that the seal member 106 can be replaced without directly touching a liquid contact portion of the seal member 106.

<Modification for a Seal Member>

Figure 16:
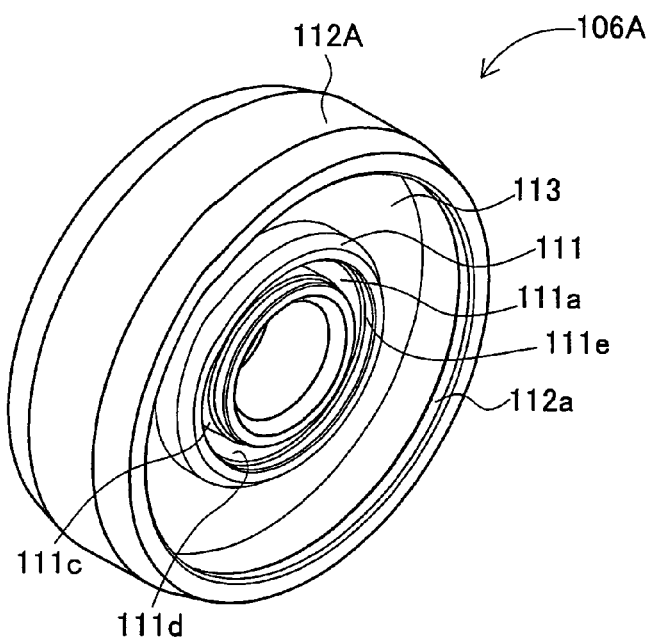
FIG. 16 is an external perspective view of a first modification of the seal member shown in FIG. 9.

Configuration of the seal member 106 is not limited to the above-mentioned one. FIG. 16 is an external perspective view of a first modification of the seal member 106 shown in FIG. 9.

For example, as a seal member 106A shown in FIG. 16, a holding portion 112A may be annularly formed in the circumferential direction of the seal member 106A. In this case, the hook portions 112a and 112b are preferably formed along an inner peripheral surface of one or both end(s) of the holding portion 112A. In the seal member 106A and the seal structure for connection sections including such the seal member 106A, even if a thickness of the holding portion 112A is thin, the holding portion 112A as a whole keeps a balance when the hook portions 112a and 112b are hooked on the first and second protrusions 104g and 105g. Accordingly, the hook portions 112a and 112b can stably be hooked on the first and second protrusions 104g and 105g. In other words, when the seal member 106A is connected to the first and second connection sections 104 and 105, it is possible to position the annular grooves 111a and 111b with respect to the annular protrusions 104b and 105b more precisely.

Moreover, the seal member 106A may be formed with through holes in portions where the extended section 113 is connected to the holding portion 112A. Accordingly, the hook portions 112a and 112 are easily removed from a die, so that the seal member 106A can be easily removed from the die.

Figure 17:
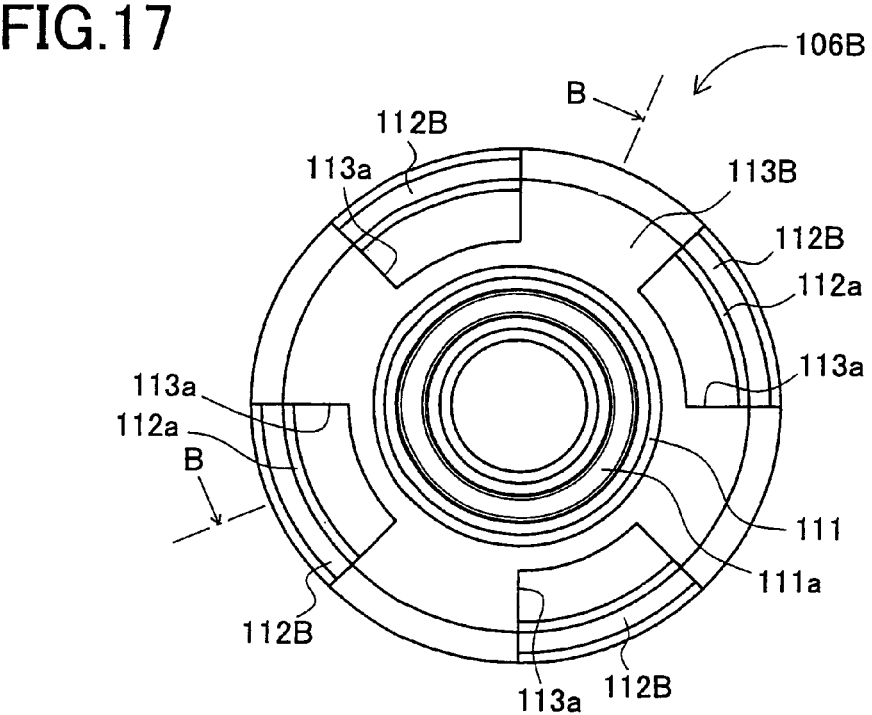
FIG. 17 is a plan view of a second modification of the seal member shown in FIG. 9.
Figure 18:
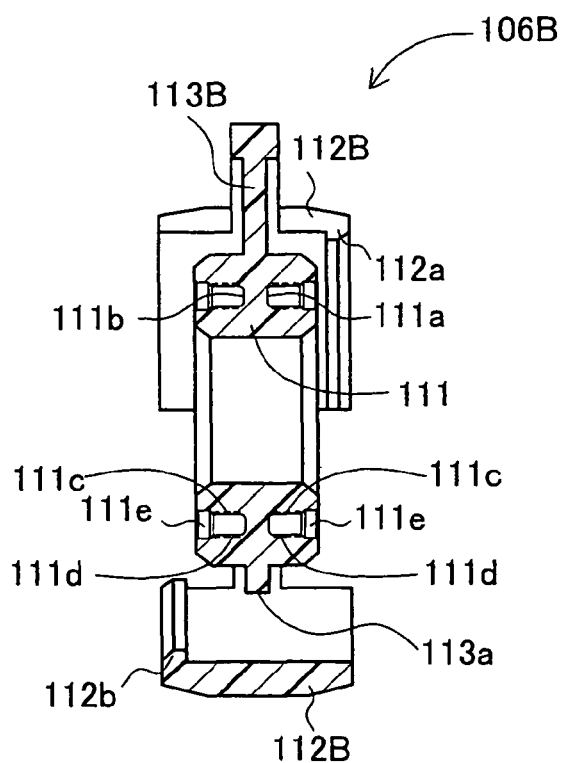
FIG. 18 is a cross-sectional view taken along a line B-B in FIG. 17.
Figure 19:
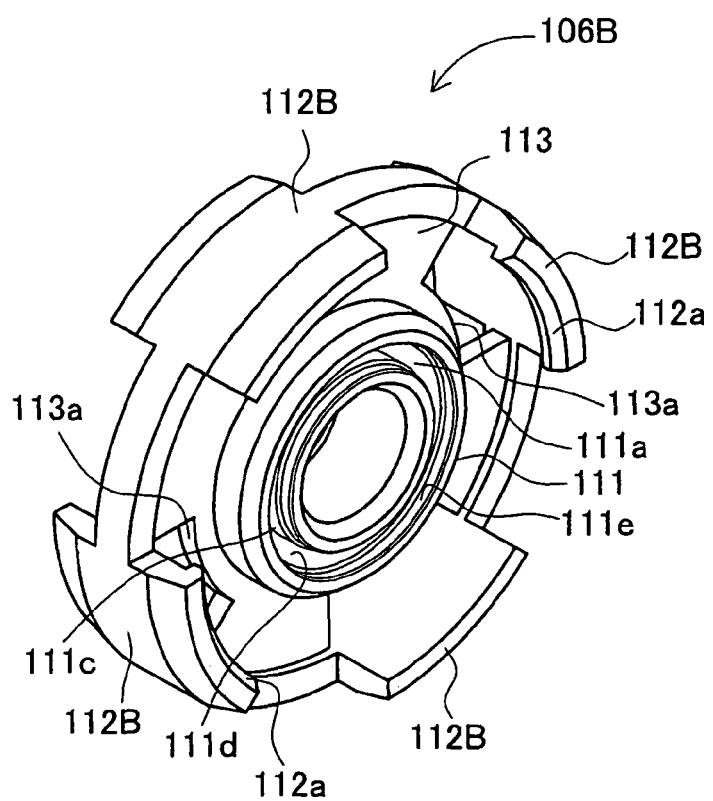
FIG. 19 is an external perspective view of the seal member shown in FIG. 17.

FIG. 17 is a plan view of a second modification of the seal member 106 shown in FIG. 9. FIG. 18 is a cross-sectional view taken along a line B-B in FIG. 17. FIG. 19 is an external perspective view of a seal member 106B shown in FIG. 17.

As the seal member 106B shown in FIGS. 17 to 19, for example, divided holding portions 112B may be formed with the hook portions 112a and 112b alternately arranged. With this configuration, the hook portions as undercuts are easily removed from a die and the seal member 106B can be easily removed from the die during the formation and the mounting orientation of the seal member 106B is not limited.

Furthermore, for example, as the seal member 106B shown in FIGS. 17 to 19, through holes 113a may be formed on connected portions of the extended section 113B with the holding portions 112B. In this case, in the seal member 106B and the seal structure for connection sections including such the seal member 106B, the holding portions 112B are easy to be deformed toward the through holes 113a, so that each holding portion 112B is easily engaged with each of the protrusions 104g and 105g of the first and second connection sections 104 and 105. Moreover, in view of manufacturing the seal member 106B, the hook portions 112a and 112b are easily removed from the die without being deformed.

Alternatively, for example, the seal member 106 may have an extended section formed of radial ribs instead of the annular extended section 113.

For example, the seal member 106 includes the four holding portions 112 dividedly arranged. Alternatively, two, three, five, or more holding portions 112 may be dividedly arranged.

For example, the seal member 106 includes the hook portions 112a and 112b provided at both ends of each holding portion 112. Alternatively, only one hook portion 112a or 112b may be formed on the holding portion 112.

For example, the seal member 106 has the holding portions 112 extending on both sides of the extended section 113. Alternatively, a holding portion may be provided extending on one side of the extended section 113 and the hook portion may be formed in such the holding portion.

For example, the seal member 106 includes the hook portions 112a and 112b provided at the ends of the holding portion 112. Alternatively, a hook portion may be provided on the extended section between the connected portion where the holding portion is connected to the extended section and the end of the extended portion.

For example, the seal member 106 includes the hook portions 112a and 112b provided along each holding portion 112. Alternatively, the hook portion(s) may be partly provided in each holding portion 112.

For example, in the above mentioned second embodiment, the seal member 106 is made of PFA. Alternatively, the seal member 106 may be made of another resin with hardness and corrosion resistance such as PP (polypropylene) and PE (polyethylene). As another alternative, the seal member 106 may be made of rubber such as EPDM (ethylene propylene diene methylene linkage) and FKM (fluorocarbon rubber).

<Modifications>

The present invention is not limited to the above-mentioned embodiments but may be variously modified.

(1) For example, the following modifications may be applied to the seal member 4 of the above-mentioned first embodiment. For example, a seal member 4A shown in FIGS. 20 and 21 may be formed with an extended section 35A having no positioning pins 37. In this case, the positioning holes 26 do not have to be formed in the first and second parts 2 and 3.

Figure 20:
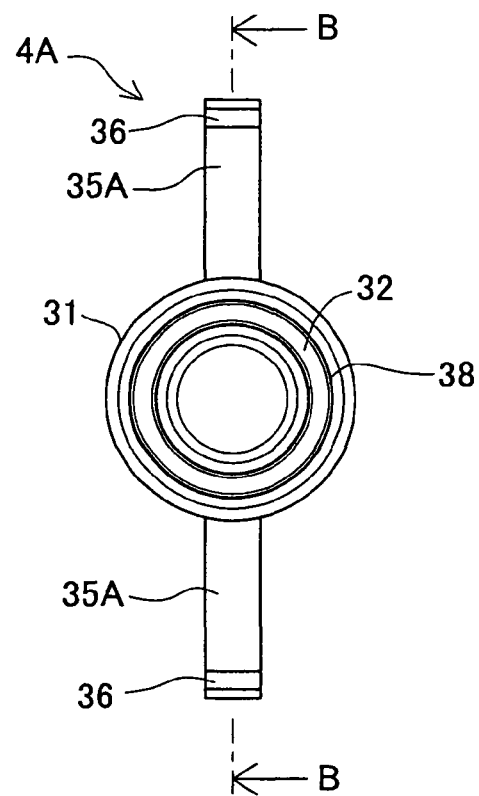
FIG. 20 is a plan view of the first modification of the seal member shown in FIG. 1.
Figure 21:
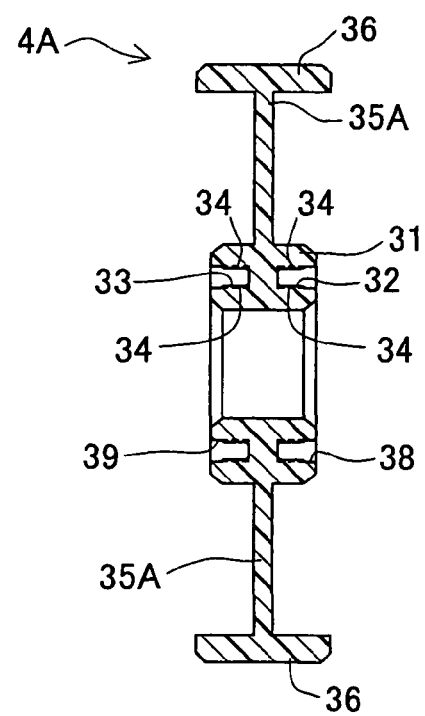
FIG. 21 is a cross-sectional view of the modification taken along a line B-B in FIG. 20.
Figure 22:
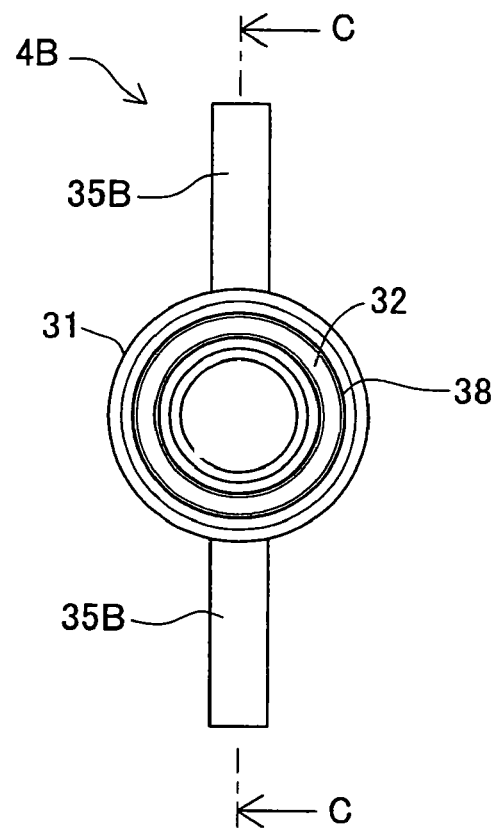
FIG. 22 is a plan view of the second modification of the seal member shown in FIG. 1.
Figure 23:
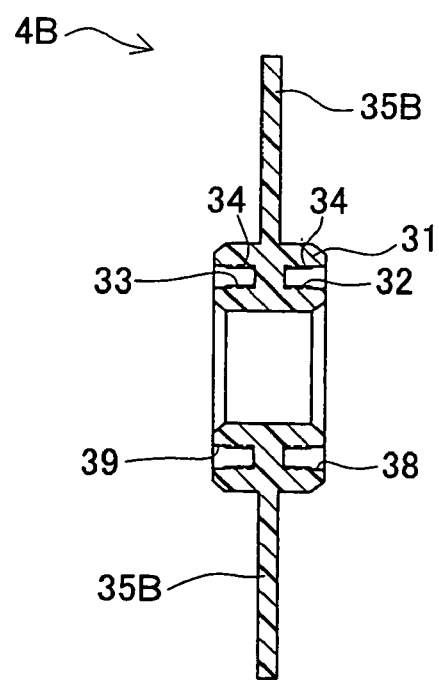
FIG. 23 is a cross-sectional view of the modification taken along a line C-C in FIG. 22.

Furthermore, the holding portions 36 of the extended section 35A in FIGS. 20 and 21 may be omitted as a seal member 4B shown in FIGS. 22 and 23 having an extended section 35B to reduce an amount of material used for manufacturing the seal member 4B. Even in this case, when the seal member 4B is attached to the first and second parts 2 and 3, as long as the extended sections 35B protrude outside the connection sections 12 and 22, the seal member 4B is easily detached from the first and second parts 2 and 3 by holding thus protruding portions with fingers.

Figure 24:
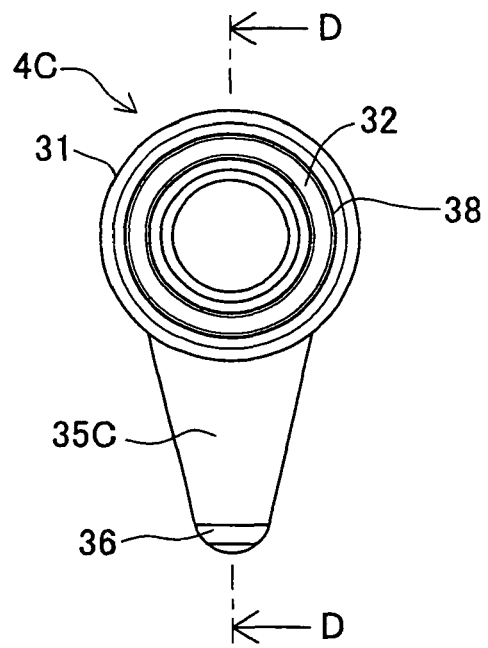
FIG. 24 is a plan view of a third modification of the seal member shown in FIG. 1.
Figure 25:
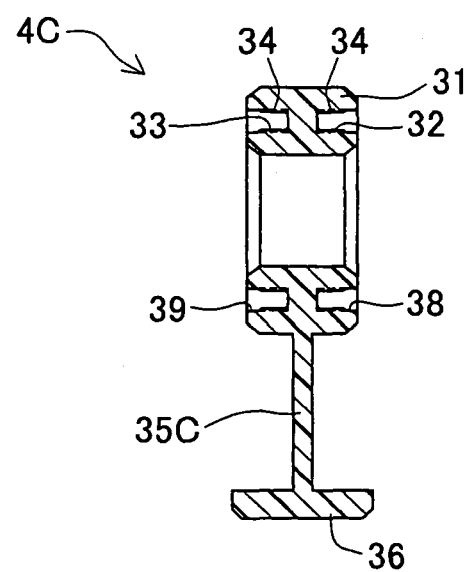
FIG. 25 is a cross-sectional view of the modification taken along a line D-D in FIG. 24.
Figure 26:
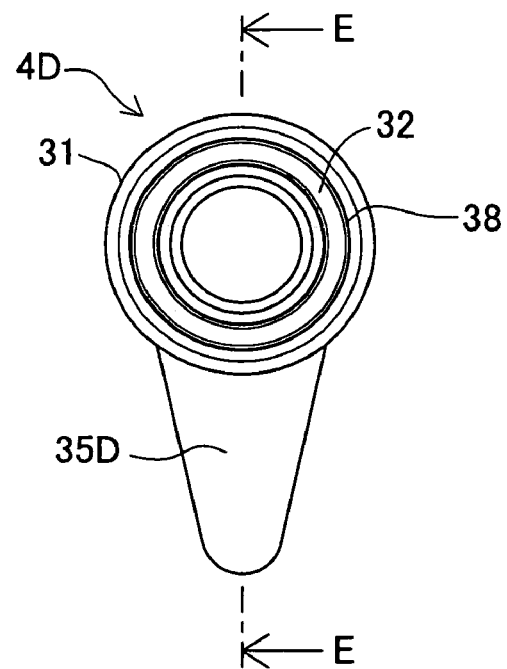
FIG. 26 is a plan view of a fourth modification of the seal member shown in FIG. 1.
Figure 27:
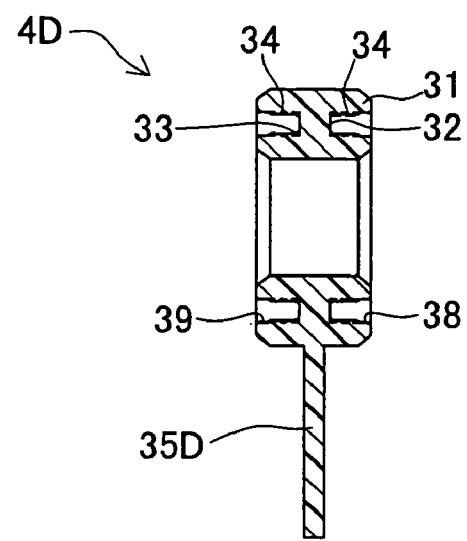
FIG. 27 is a cross-sectional view of the modification taken along a line E-E in FIG. 26.

Further, in the seal member 4 of the above-mentioned first embodiment, a pair of the extended sections 35 is symmetrically provided with respect to the body section 31. Alternatively, as a seal member 4C shown in FIGS. 24 and 25, a single extended section 35C may be provided only on one side of the body section 31. In this case, the extended section 35C may be tapered into an almost triangular shape so that the pulling force to pull the extended section 35C is widely dispersed in the connected portions of the body section 31 and the extended section 35C. In addition, a distal end of the extended section 35C may be formed with the holding portion 36. Alternatively, a seal member 4D shown in FIGS. 26 and 27 may omit the holding portion 36 of the extended section 35C in FIGS. 24 and 25 to constitute an extended section 35D.

Figure 28:
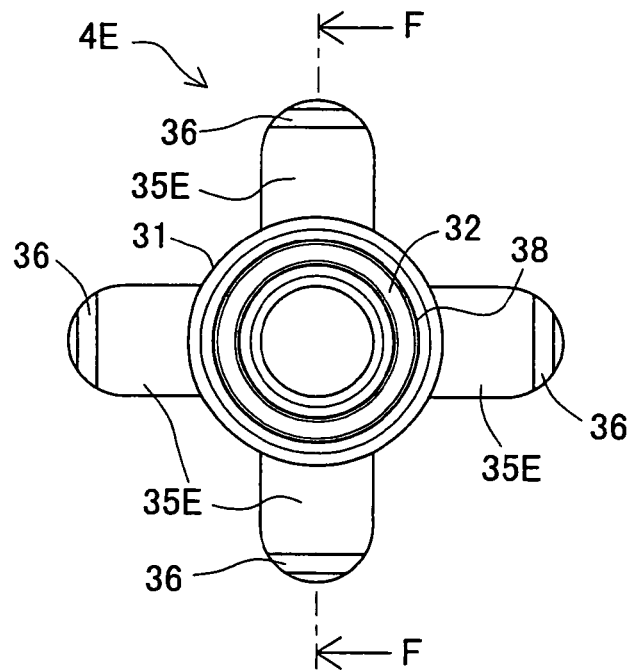
FIG. 28 is a plan view of a fifth modification of the seal member shown in FIG. 1.
Figure 29:
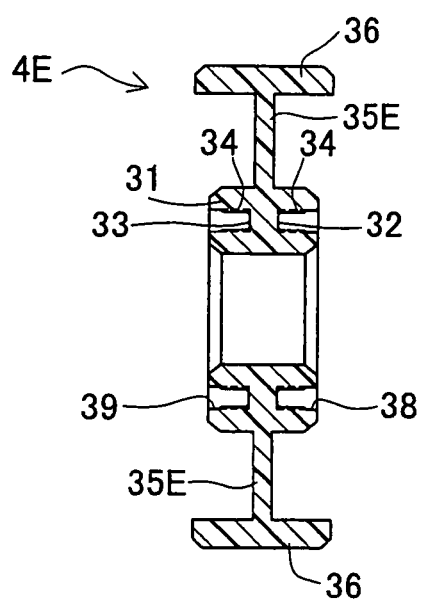
FIG. 29 is a cross-sectional view of the modification taken along a line F-F in FIG. 28.
Figure 30:
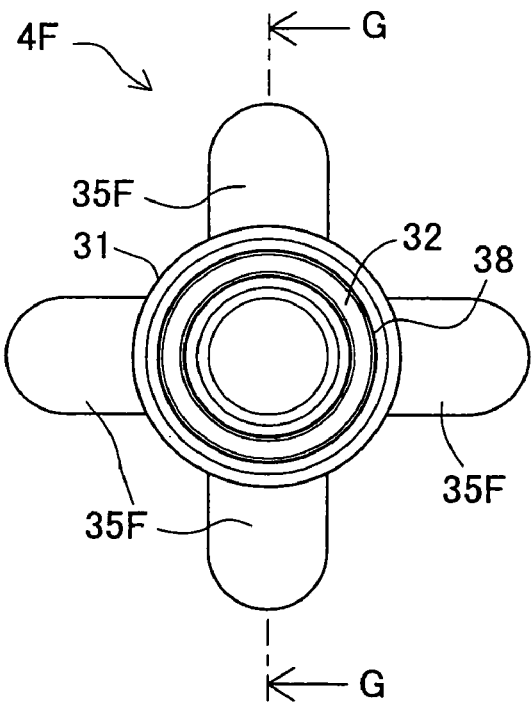
FIG. 30 is a plan view of a sixth modification of the seal member shown in FIG. 1.
Figure 31:
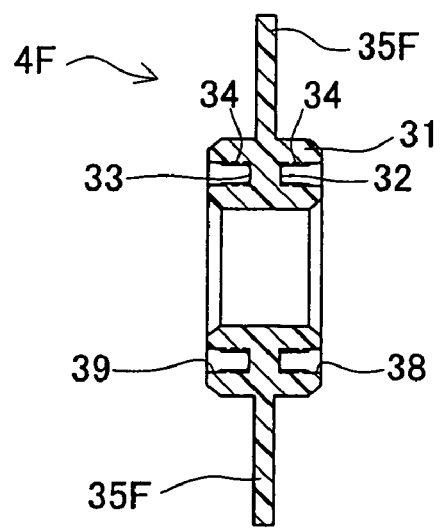
FIG. 31 is a cross-sectional view of the modification taken along a line G-G in FIG. 30.

Alternatively, a seal member 4E shown in FIGS. 28 and 29 may be formed with extended sections 35E extending from an outer peripheral wall of the body section 31 at equal intervals in the circumferential direction (herein, the extended sections 35E are arranged around the body section 31 in a cross shape). Each end portion of each extended section 35E is preferably formed with the holding portion 36. When a plurality of the extended sections 35E are provided in this way, the orientation to hold the holding portions 36 is less limited, facilitating the attachment and detachment operation of the seal member 4E. Moreover, a seal member 4F shown in FIGS. 30 and 31 may be adopted in which extended sections 35F are formed instead of the extended section 35E having the holding portions 36.

Figure 32:
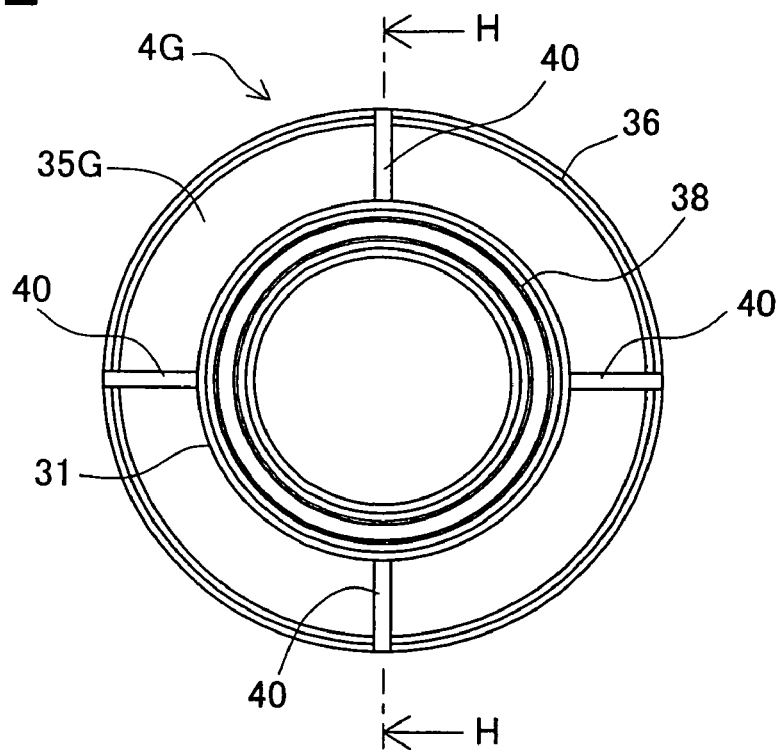
FIG. 32 is a plan view of a seventh modification of the seal member shown in FIG. 1.
Figure 33:
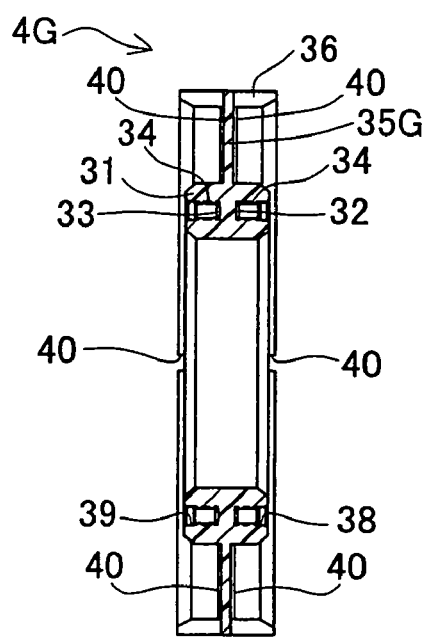
FIG. 33 is a cross-sectional view of the modification taken along a line H-H in FIG. 32.

Alternatively, a seal member 4G shown in FIGS. 32 and 33 may be annularly formed with an extended section 35G along the outer peripheral wall of the body section 31. The extended section 35G may be further formed with the holding portion 36 on the end portion (the outer edge). Thereby, the mounting orientation of the seal member 4G is not limited and the strength of the extended section 35G is assured, preventing damages caused when the seal member 4G is attached and detached.

However, when the extended section 35G is annularly shaped to come into contact with the whole surfaces of the connection sections 12 and 22, the extended section 35G is sealed to the connection sections 12 and 22. As a result, there is a possibility that the sealing performance of the press-fitted portion to be originally sealed might not be confirmed. To avoid such a disadvantage, grooves 40 are formed on each surface of the extended section 35G, each groove 40 radially extending from the body section 31 toward the outer edge of the extended section 35G to prevent the extended section 35G from being tightly sealed to the connection sections 12 and 22 when the seal member 4G is placed between the connection section 12 of the first part 2 and the connection section 22 of the second part 3. In addition, four grooves 40 are formed in the present modification, but the number of the grooves 40 is not limited to four.

Figure 34:
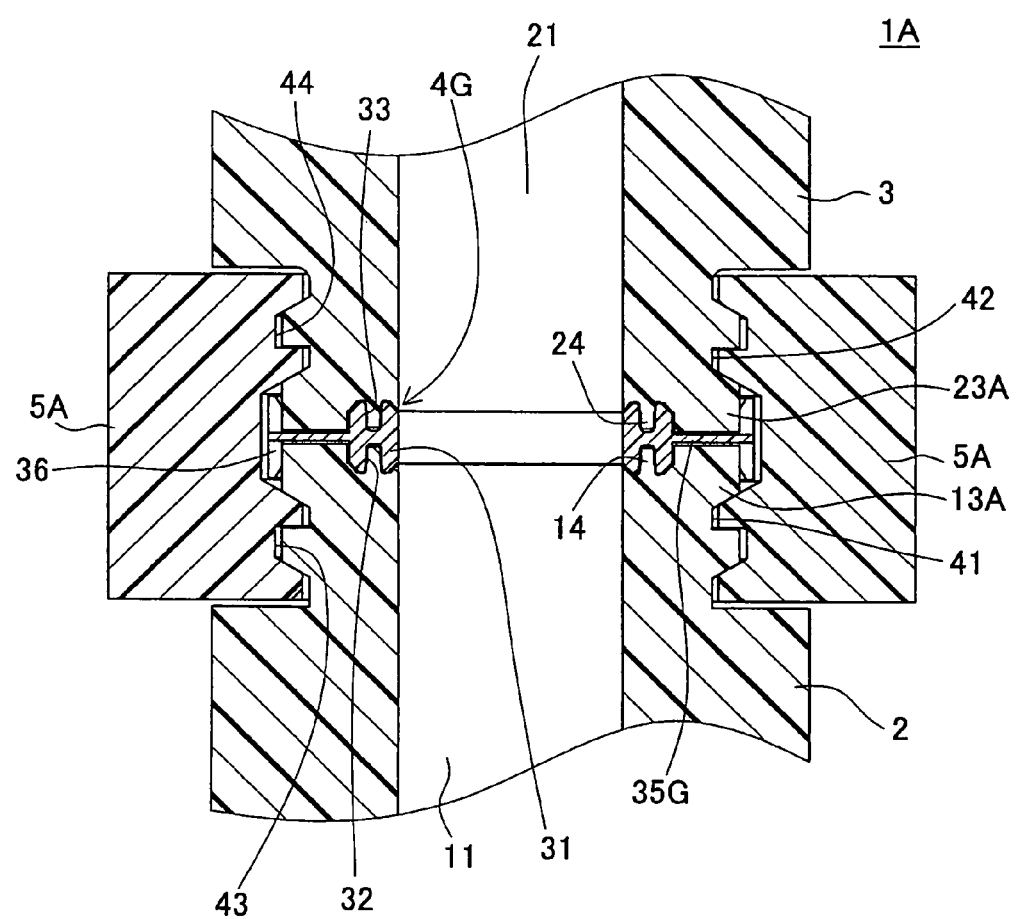
FIG. 34 is a modification of the seal structure for connection sections shown in FIG. 1.

(2) In the above first embodiment, the coupling member 5 attached to the first and second flanges 13 and 23 has a U-shaped cross-section. Alternatively, as a seal structure 1A for connection sections in FIG. 34, the connection sections of the first and second parts 2 and 3 may be formed on end surfaces of a first flange 13A and a second flange 23A. The first and second flanges 13A and 23A may be formed with a groove-ridge recess 41 and a groove-ridge recess 42 respectively on the outer peripheral surfaces and ridge-groove portions 43 and 44 to be fitted with the groove-ridge recesses 41 and 42 may be formed on the inner peripheral surfaces of coupling members 5A. Further, sliding surfaces between the groove-ridge recesses 41 and 42 and the ridge-groove portions 43 and 44 may be slanted so that the strength generated when the ridge-groove portions 43 and 44 are pressed and fitted in the groove-ridge recesses 41 and 42 acts on the sealing surfaces of the first and second flanges 13A and 23A. This configuration allows the body section 31 of the seal member 4G to be easily pressed in the circumferential direction with uniform strength, enhancing the sealing performance.

(3) In the above first embodiment, the positioning pins 37 are pin-like shaped. Alternatively, positioning pins may be of plate-like shape.

Figure 35:
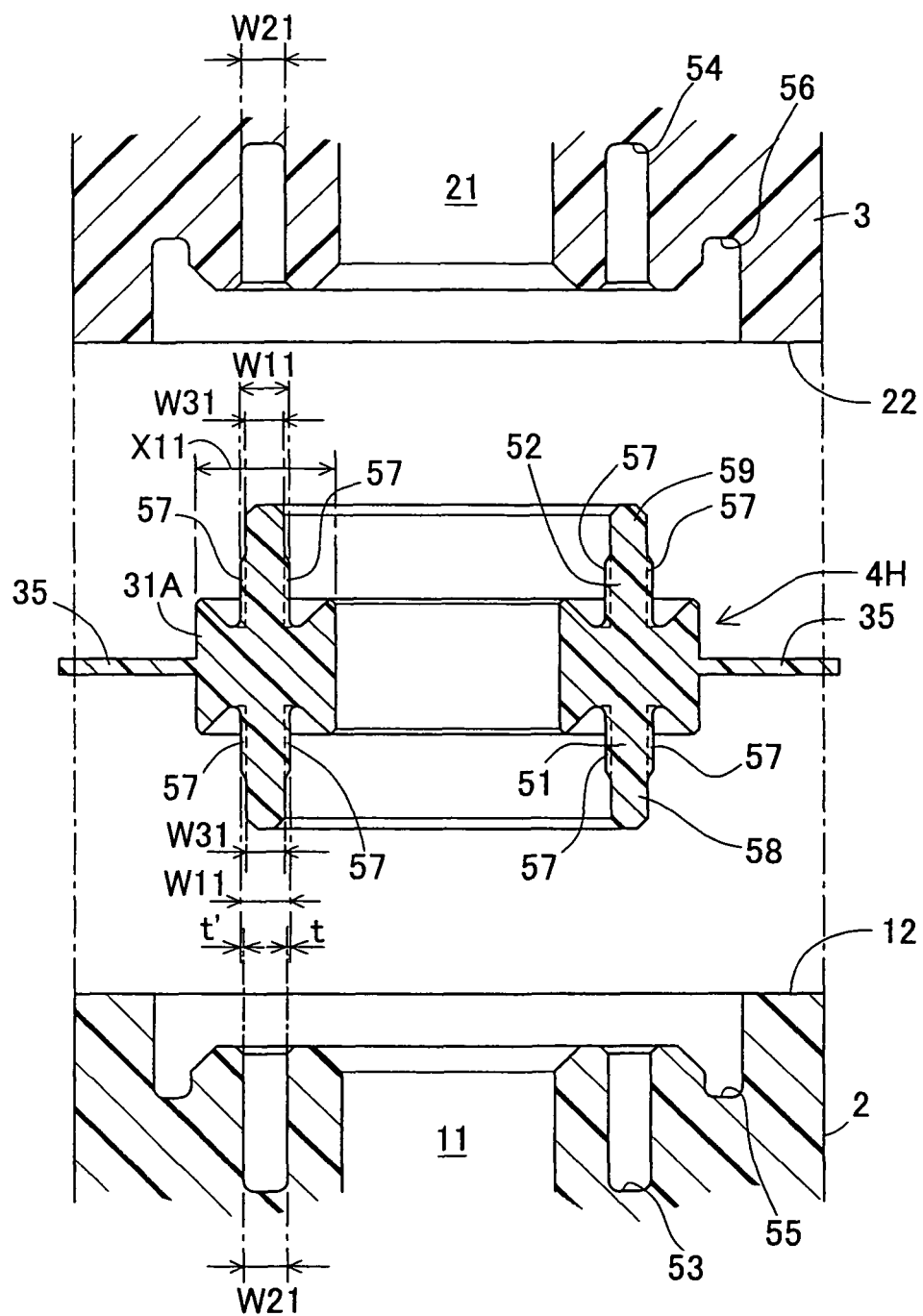
FIG. 35 is a modification of the seal structure for connection sections shown in FIG. 1.

(4) In the above first embodiment, the seal member 4 is formed with the first and second annular grooves 32 and 33 and the first and second annular protrusions 14 and 24 are formed on the first and second parts 2 and 3. As an alternative, as shown in FIG. 35, a seal member 4H may be adopted in which a body section 31A is provided with first and second fitting portions formed with first and second annular protrusions 51 and 52 respectively on both end surfaces of the body section 31A, and the first and second connection sections 12 and 22 may be formed with first and second groove-ridge sections 55 and 56, each including a first annular groove 53 to be fitted in the first annular protrusion 51 of the seal member 4H and a second annular groove 54 to be fitted in the second annular protrusion 52 of the seal member 4H.

In this case, the first and second annular protrusions 51 and 52 may be formed with press-fitting interferences 57 located inward than leading ends of the annular protrusions, thickened by a thickness t, t' in the thickness direction X11. Specifically, the width W31 of each of the leading ends of the first and second annular protrusions 51 and 52 is narrower than the width W11 of each of proximal ends of the press-fitting interferences 57, thus creating shoulders between the distal ends and the proximal ends in the first and second annular protrusions 51 and 52. The width W31 of each of the distal ends of the annular protrusions 51 and 52 is determined to be almost equal to or slightly wider than the width W21 of each of the first and second annular grooves 53 and 54 formed on the first and second parts 2 and 3. Therefore, the distal ends of the first and second annular protrusions 51 and 52 function as guide portions 58 and 59 for introducing the first and second annular protrusions 51 and 52 to the first and second annular grooves 53 and 54 when the first and second annular protrusions 51 and 52 are inserted. In this way, the guide portions 58 and 59 for introducing the press-fitting interferences 57 to the first and second annular grooves 53 and 54 are formed on the distal ends of the first and second annular protrusions 51 and 52, so that the first and second annular protrusions 51 and 52 are easily press-fitted in the first and second annular grooves 53 and 54. Therefore, the seal member 4H is effectively mounted. The first and second annular protrusions 51 and 52 press-fitted in the first and second annular grooves 53 and 54 are sealed in the region where each press-fitting interference 57 is pressed.

Additionally, the thickness of each press-fitting interference 57 formed in the first and second annular protrusions 51 and 52 of the seal member 4H is expressed by: $t+t'=W11-W21$. In the case that the first and second annular protrusions 51 and 52 are press-fitted in the annular grooves 53 and 54 respectively, the pressing ratio of the press-fitting interference 57 is preferably set in a range of 0.1 to 0.3 as same as the above first embodiment.

(5) For example, in the above-mentioned second embodiment, the seal structure 101 for connection sections and the seal members 106, 106A, and 106B are adopted to the contact portions between the passage 104h of the first fluid device and the passage 105h of the second fluid device are connected by the coupling member 107. Alternatively, for example, the seal structure 101 for connection sections and the seal members 106, 106A, and 106B may be adopted for sealing connection sections of a valve body of a valve and an actuator connected by bolts and connection sections of fluid devices and a manifold connected by bolts or a coupling member.

(6) For example, alternatively, instead of the annular protrusions 104b and 105b formed on the first and second connection sections 104 and 105 of the above second embodiment, annular grooves may be adopted and instead of the annular grooves 111a and 111b formed on the seal member 106 of the above second embodiment, annular protrusions formed with press-fitting interferences may be adopted so that the annular grooves and the annular protrusions can be sealed in the press-fitted region.

(7) For example, in the above second embodiment, the first and second bodies 102 and 103 and the first and second connection sections 104 and 105 are constituted of resin-made parts. Alternatively, the first and second bodies 102 and 103 and the first and second connection sections 104 and 105 may be constituted of metal-made parts.

The invention claimed is:

1. A seal structure for connection sections comprising:
a first part including a connection section formed with a first groove-ridge section;
a second part including a connection section formed with a second groove-ridge section; and
a seal member placed between the connection sections of the first part and the second part, the seal member comprising a first fitting portion in a first surface engageable with the first groove-ridge section and a second fitting portion in a second surface engageable with the second groove-ridge section, each of the first and second fitting portions being formed with a press-fitting interference in the thickness direction,
wherein:
the seal member includes an extended section extending outside an annular body section including the first and second fitting portions in a radially outward direction so that the extended section protrudes outward than the connection sections of the first and second parts and a holding portion extending from an end portion of the extended section in a direction orthogonal to the extended section,
the first fitting portion is formed with a first annular groove, the press-fitting interference being formed on an inner periphery of the first annular groove,
the second fitting portion is formed with a second annular groove, the press-fitting interference being formed on an inner periphery of the second annular groove, and
the first and second annular grooves, the press-fitting interferences of the first and second fitting portions, and the holding portion are formed in parallel to each other.

2. The seal structure for connection sections according to claim 1,
wherein the seal member further comprises positioning protrusions extending from both sides of the extended section and in parallel with an axis of the body section, the first part includes a first positioning hole for receiving one of the positioning protrusions to position the first part in place, and
the second part includes a second positioning hole for receiving one of the positioning protrusions to position the second part in place.

3. A seal structure for connection sections comprising a first part and a second part, each being formed with an annular groove-ridge section along a periphery of a passage opening portion,
the seal structure for connection sections further comprising a seal member placed between the connection sections of the first and second parts and formed with an annular ridge-groove section press-fitted in the annular groove-ridge section for sealing the connection sections of the first and second parts,
wherein:
the seal member includes:
a cylindrical body section formed with the annular ridge-groove section;
an extended section radially outwardly extending from the body section; and
a holding portion connected to the body section via the extended section and extending orthogonally with respect to the extended section, the holding portion having a hook portion projecting toward the body section,
the first fitting portion is formed with a first annular groove, the press-fitting interference being formed on an inner periphery of the first annular groove,
the second fitting portion is formed with a second annular groove, the press-fitting interference being formed on an inner periphery of the second annular groove,
the first and second annular grooves, the press-fitting interferences of the first and second fitting portions, and the holding portion are formed in parallel to each other, and
the first and second parts including protrusions to be engaged with the hook portion.

4. The seal structure for connection sections according to claim 3, wherein the seal member comprises the hook portion in the holding portion so that the hook portion is hooked on the protrusion for positioning the annular ridge-groove section and the annular groove-ridge section.

5. The seal structure for connection sections according to claim 3, wherein the seal member includes the holding portion divided and spaced in a circumferential direction.

6. The seal structure for connection sections according to claim 3, wherein the seal member comprises the holding portion annularly formed in a circumferential direction and the hook portion formed along an inner periphery of the holding portion.

7. The seal structure for connection sections according to claim 3, wherein the seal member is formed with a through hole in a region where the holding portion is connected to the extended section.

8. The seal structure for connection sections according to claim 3, wherein the seal member is formed with the hook portion at both ends of the holding portion.

9. A seal member applied to the seal structure for connection sections according to claim 3.

* * * * *